(12) United States Patent
Shapiro et al.

(10) Patent No.: US 11,860,606 B2
(45) Date of Patent: *Jan. 2, 2024

(54) FABRICATION WITH IMAGE TRACING

(71) Applicant: Glowforge Inc., Seattle, WA (US)

(72) Inventors: Daniel Shapiro, Mercer Island, WA (US); Mark Gosselin, Seattle, WA (US); Anthony Wright, Seattle, WA (US); Jonathan Park, Seattle, WA (US); Kevin McVey, Seattle, WA (US); Scott Haug, Seattle, WA (US); Rachael Ludwick, Seattle, WA (US); Daniel Martinec, Seattle, WA (US)

(73) Assignee: Glowforge, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,143

(22) Filed: Feb. 14, 2022

(65) Prior Publication Data

US 2022/0276632 A1 Sep. 1, 2022

Related U.S. Application Data

(63) Continuation of application No. 15/823,502, filed on Nov. 27, 2017, now Pat. No. 11,249,456.

(Continued)

(51) Int. Cl.
*G05B 19/4097* (2006.01)
*G06T 7/40* (2017.01)
*G05B 19/4093* (2006.01)

(52) U.S. Cl.
CPC ..... *G05B 19/4097* (2013.01); *G05B 19/4093* (2013.01); *G06T 7/40* (2013.01);

(Continued)

(58) Field of Classification Search
CPC ............ G05B 19/4097; G05B 19/4093; G05B 2219/35134; G05B 2219/36175;

(Continued)

(56) References Cited

U.S. PATENT DOCUMENTS 3,721,811 A 3/1973 Taylor et al.
3,967,176 A 6/1976 Wagener et al.
(Continued)

FOREIGN PATENT DOCUMENTS

CN 1364033 A 8/2002
CN 101095033 A 12/2007
(Continued)

OTHER PUBLICATIONS

Dazhong Wu et al. "Cloud Manufacturing: Drivers, Current Status,and Future Trends" vol. 2. Systems; Micro and Nano Technologies Sustainable Manufacturing. Jun. 10, 2013. [Retrieved on May 10, 2016 ] pp. 1-10.

(Continued)

*Primary Examiner* — Charles Cai
(74) *Attorney, Agent, or Firm* — LEE SULLIVAN SHEA & SMITH LLP

(57) ABSTRACT

A method may include generating, by a camera having a view of an interior portion of a computer-numerically-controlled machine, an image comprising a pattern. The image can be transformed into a set of machine instructions for controlling the computer-numerically-controlled machine to effect a change in a material. The change can correspond to at least a portion of the pattern. At least one machine instruction from the set of machine instructions can be executed to control the computer-numerically-controlled machine to effect at least a portion of the change. The execution can include operating, in accordance with the at least one machine instruction, a tool coupled with the (Continued)

computer-numerically-controlled machine. The tool can be configured to effect the change on the material. Related systems and articles of manufacture, including computer program products, are also provided.

19 Claims, 28 Drawing Sheets

Related U.S. Application Data

(60) Provisional application No. 62/426,425, filed on Nov. 25, 2016.

(52) U.S. Cl.
CPC .............. G05B 2219/35134 (2013.01); G05B 2219/36175 (2013.01); G05B 2219/45165 (2013.01); G05B 2219/45212 (2013.01); Y02P 90/02 (2015.11)

(58) Field of Classification Search
CPC ........... G05B 2219/45165; G05B 2219/45212; G06T 7/40; G06V 10/40; G06V 10/473; Y02P 90/02
See application file for complete search history.

(56) References Cited

U.S. PATENT DOCUMENTS

| | | | |
|---|---|---|---|
| 4,055,787 A | 10/1977 | Beadle et al. | |
| 4,138,718 A | 2/1979 | Toke et al. | |
| 4,518,843 A | 5/1985 | Antol et al. | |
| 4,650,287 A | 3/1987 | Kudo et al. | |
| 4,723,219 A | 2/1988 | Beyer et al. | |
| 4,901,359 A | 2/1990 | Bruder | |
| 4,918,611 A | 4/1990 | Shyu et al. | |
| 5,298,843 A | 3/1994 | Miyajima et al. | |
| 5,355,250 A | 10/1994 | Grasso et al. | |
| 5,396,279 A | 3/1995 | Zossen | |
| 5,475,521 A | 12/1995 | Heidemann | |
| 5,682,319 A | 10/1997 | Boland et al. | |
| 5,756,961 A | 5/1998 | Sato et al. | |
| 6,031,200 A | 2/2000 | Whitehouse | |
| 6,085,122 A | 7/2000 | Manning | |
| 6,420,674 B1 | 7/2002 | Cole, III et al. | |
| 6,609,044 B1 | 8/2003 | Basista et al. | |
| 6,628,322 B1 | 9/2003 | Cerruti | |
| 7,005,606 B2 | 2/2006 | Legge et al. | |
| 8,111,904 B2 | 2/2012 | Wallack et al. | |
| 8,136,432 B2 | 3/2012 | Travez et al. | |
| 8,809,780 B2 | 8/2014 | Wollenhaupt et al. | |
| 9,020,628 B2 | 4/2015 | Fagan | |
| 9,235,205 B2 | 1/2016 | Prestidge et al. | |
| 9,469,338 B2 | 10/2016 | Norberg Ohlsson | |
| 9,618,926 B1 | 4/2017 | Louette et al. | |
| 9,734,419 B1 | 8/2017 | Ye et al. | |
| 9,772,067 B2 | 9/2017 | Bunz et al. | |
| 9,782,906 B1* | 10/2017 | Aminpour | B26D 5/005 |
| 9,912,915 B2 | 3/2018 | Sinclair | |
| 9,987,798 B2 | 6/2018 | Tyler | |
| 10,234,260 B2 | 3/2019 | Siercks et al. | |
| 10,241,498 B1* | 3/2019 | Beard | B33Y 50/02 |
| 10,642,251 B2 | 5/2020 | Platts et al. | |
| 2001/0012973 A1 | 8/2001 | Wehrli et al. | |
| 2002/0129485 A1 | 9/2002 | Mok et al. | |
| 2003/0049373 A1 | 3/2003 | Van De Rijdt et al. | |
| 2004/0029493 A1 | 2/2004 | Tricard et al. | |
| 2004/0207831 A1 | 10/2004 | Aoyama | |
| 2004/0223165 A1 | 11/2004 | Kurokawa et al. | |
| 2005/0051523 A1 | 3/2005 | Legge et al. | |
| 2005/0069682 A1 | 3/2005 | Tseng | |
| 2005/0071020 A1 | 3/2005 | Yamazaki et al. | |
| 2005/0115941 A1 | 6/2005 | Sukhman et al. | |
| 2005/0142701 A1 | 6/2005 | Yamaguchi et al. | |
| 2005/0187651 A1 | 8/2005 | Kimura et al. | |
| 2006/0043615 A1 | 3/2006 | Zheng et al. | |
| 2007/0032733 A1 | 2/2007 | Burton | |
| 2007/0181544 A1 | 8/2007 | Sukhman et al. | |
| 2008/0058734 A1 | 3/2008 | Hanft et al. | |
| 2008/0100829 A1 | 5/2008 | Watson | |
| 2008/0101687 A1 | 5/2008 | Goeller | |
| 2008/0149604 A1 | 6/2008 | Varriano-Marston et al. | |
| 2008/0160254 A1 | 7/2008 | Arnold | |
| 2008/0243299 A1 | 10/2008 | Johnson et al. | |
| 2008/0249653 A1 | 10/2008 | Ichikawa | |
| 2009/0120914 A1 | 5/2009 | Lawrence | |
| 2009/0250445 A1 | 10/2009 | Yamaguchi et al. | |
| 2009/0308851 A1 | 12/2009 | Harnisch et al. | |
| 2010/0063603 A1 | 3/2010 | Chandhoke | |
| 2010/0081971 A1 | 4/2010 | Allison | |
| 2010/0149337 A1 | 6/2010 | Porcino | |
| 2010/0193482 A1 | 8/2010 | Ow et al. | |
| 2010/0274379 A1 | 10/2010 | Hehl | |
| 2010/0301023 A1 | 12/2010 | Unrath et al. | |
| 2010/0326962 A1 | 12/2010 | Calla et al. | |
| 2011/0005458 A1 | 1/2011 | Cunningham | |
| 2011/0080476 A1 | 4/2011 | Dinauer et al. | |
| 2011/0127333 A1 | 6/2011 | Veksland et al. | |
| 2011/0135208 A1 | 6/2011 | Atanassov et al. | |
| 2011/0193943 A1 | 8/2011 | Campbell | |
| 2011/0286007 A1 | 11/2011 | Pangrazio et al. | |
| 2011/0316977 A1 | 12/2011 | Pienaar | |
| 2012/0026249 A1 | 2/2012 | Kihira et al. | |
| 2012/0035745 A1 | 2/2012 | Mori et al. | |
| 2012/0117787 A1 | 5/2012 | Sun et al. | |
| 2012/0120232 A1 | 5/2012 | Nishikawa | |
| 2012/0197427 A1* | 8/2012 | Gallucci | B26D 5/005 382/141 |
| 2012/0293821 A1 | 11/2012 | Chiba | |
| 2013/0158957 A1 | 6/2013 | Lee et al. | |
| 2013/0178972 A1 | 6/2013 | Goldsmith et al. | |
| 2013/0190898 A1 | 7/2013 | Shilpiekandula et al. | |
| 2013/0200053 A1 | 8/2013 | Bordatchev | |
| 2013/0304248 A1 | 11/2013 | Lange et al. | |
| 2014/0005804 A1 | 1/2014 | Brand | |
| 2014/0018779 A1 | 1/2014 | Worrell et al. | |
| 2014/0039707 A1 | 2/2014 | Curtis et al. | |
| 2014/0046131 A1 | 2/2014 | Morita et al. | |
| 2014/0071330 A1 | 3/2014 | Zhang et al. | |
| 2014/0071486 A1 | 3/2014 | Van Bauwel | |
| 2014/0071502 A1 | 3/2014 | Liu | |
| 2014/0160273 A1 | 6/2014 | Jedynak et al. | |
| 2014/0268607 A1 | 9/2014 | Wicker et al. | |
| 2014/0299586 A1 | 10/2014 | Sawabe et al. | |
| 2014/0310122 A1 | 10/2014 | Danielson et al. | |
| 2014/0327687 A1 | 11/2014 | Murakami et al. | |
| 2014/0330424 A1 | 11/2014 | Garaas et al. | |
| 2014/0371895 A1 | 12/2014 | Sadusk et al. | |
| 2015/0030821 A1 | 1/2015 | Costin, Sr. et al. | |
| 2015/0107033 A1 | 4/2015 | Chang et al. | |
| 2015/0108095 A1 | 4/2015 | Kruer et al. | |
| 2015/0112470 A1 | 4/2015 | Chang et al. | |
| 2015/0136949 A1 | 5/2015 | De Nooij et al. | |
| 2015/0154453 A1 | 6/2015 | Wilf | |
| 2015/0158121 A1 | 6/2015 | Di Cairano et al. | |
| 2015/0158311 A1 | 6/2015 | Ogasawara et al. | |
| 2015/0197064 A1 | 7/2015 | Walker et al. | |
| 2015/0212421 A1 | 7/2015 | Devilliers et al. | |
| 2015/0228069 A1 | 8/2015 | Fresquet et al. | |
| 2015/0245549 A1 | 8/2015 | Kurita et al. | |
| 2015/0301327 A1 | 10/2015 | Okugawa et al. | |
| 2015/0355621 A1 | 12/2015 | Ikeda et al. | |
| 2015/0360318 A1 | 12/2015 | Aubry | |
| 2015/0378348 A1 | 12/2015 | Gupta et al. | |
| 2016/0059371 A1 | 3/2016 | Chang et al. | |
| 2016/0084649 A1 | 3/2016 | Yamazaki et al. | |
| 2016/0093540 A1 | 3/2016 | Liu et al. | |
| 2016/0147213 A1 | 5/2016 | Murakami | |
| 2016/0156771 A1 | 6/2016 | Lee | |
| 2016/0199945 A1 | 7/2016 | McDowell et al. | |
| 2016/0210737 A1 | 7/2016 | Straub et al. | |
| 2016/0271718 A1 | 9/2016 | Fagan | |
| 2016/0303845 A1 | 10/2016 | Arce | |

(56) References Cited

U.S. PATENT DOCUMENTS

| | | | |
|---|---|---|---|
| 2016/0325541 | A1 | 11/2016 | Lavrentyev et al. |
| 2016/0349038 | A1 | 12/2016 | Ohtsuka et al. |
| 2016/0360409 | A1 | 12/2016 | Singh |
| 2017/0008127 | A1 | 1/2017 | Hyatt et al. |
| 2017/0045877 | A1 | 2/2017 | Shapiro et al. |
| 2017/0045879 | A1 | 2/2017 | Yang et al. |
| 2017/0051429 | A1 | 2/2017 | Sachs et al. |
| 2017/0057008 | A1* | 3/2017 | Liu .................. G06T 7/0004 |
| 2017/0123362 | A1 | 5/2017 | Masui et al. |
| 2017/0203390 | A1 | 7/2017 | Kato |
| 2017/0235293 | A1 | 8/2017 | Shapiro et al. |
| 2017/0235294 | A1 | 8/2017 | Shapiro et al. |
| 2017/0243374 | A1 | 8/2017 | Matsuzawa |
| 2017/0341183 | A1 | 11/2017 | Buller et al. |
| 2018/0001565 | A1 | 1/2018 | Hocker |
| 2018/0113434 | A1 | 4/2018 | Shapiro et al. |
| 2018/0147657 | A1 | 5/2018 | Shapiro |
| 2018/0147658 | A1 | 5/2018 | Shapiro |
| 2018/0147659 | A1 | 5/2018 | Shapiro |
| 2018/0150047 | A1 | 5/2018 | Shapiro |
| 2018/0150055 | A1 | 5/2018 | Shapiro |
| 2018/0150062 | A1 | 5/2018 | Shapiro |
| 2019/0014307 | A1 | 1/2019 | McNamer et al. |
| 2019/0058870 | A1 | 2/2019 | Rowell et al. |
| 2019/0278250 | A1* | 9/2019 | Clement ............. B25J 9/1697 |
| 2020/0039002 | A1 | 2/2020 | Sercel et al. |
| 2020/0192332 | A1 | 6/2020 | Jacobs et al. |

FOREIGN PATENT DOCUMENTS

| | | |
|---|---|---|
| CN | 101283362 A | 10/2008 |
| CN | 201253852 Y | 6/2009 |
| CN | 101559513 A | 10/2009 |
| CN | 101733558 A | 6/2010 |
| CN | 101837517 A | 9/2010 |
| CN | 205958834 U | 2/2017 |
| CN | 106670656 A | 5/2017 |
| DE | 102014214058 A1 | 1/2016 |
| EP | 0954125 A2 | 11/1999 |
| EP | 1309108 A1 | 5/2003 |
| EP | 2471625 A2 | 7/2012 |
| EP | 2808123 A1 | 12/2014 |
| FR | 2748562 A1 | 11/1997 |
| JP | H03254380 A | 11/1991 |
| JP | 04244347 A | 9/1992 |
| JP | H05205051 A | 8/1993 |
| JP | H06196557 A | 7/1994 |
| JP | 2001330413 A | 11/2001 |
| JP | 2002123306 A | 4/2002 |
| JP | 2006329751 A | 12/2006 |
| JP | 2008119718 A | 5/2008 |
| WO | 199403302 A1 | 2/1994 |
| WO | 9623240 A1 | 8/1996 |
| WO | 2001076250 A1 | 10/2001 |
| WO | 2016131019 A1 | 8/2016 |
| WO | 2016131022 A1 | 8/2016 |

OTHER PUBLICATIONS

Sao, Rong et al. "Human-Machine Collaborative Workshop Digital Manufacturing." /C/CTA. 2010 IEEE, May 11, 2010 . pp. 445-448.
International Searching Authority, International Search Report and Written Opinion issued in International Application No. PCT/US2017/063188, dated Feb. 16, 2018. 14 pages.
European Patent Office, Examination Report issued in European Patent Application No. 16709185.9, dated Jul. 1, 2020. 5 pages.
First Office Action issued in Chinese Patent Application No. 201680021337.8, dated Apr. 10, 2019. 6 pages. [Chinese language].
First Office Action issued in Chinese Patent Application No. 201680021337.8, dated Apr. 10, 2019. 8 pages. [English language translation].
Inmagine Group. Vectr Free Online Vector Graphics Software Retrieved Mar. 22, 2021, from https://vectr.com/. 3 pages.
International Searching Authority, International Search Report and Written Opinion issued in International Application No. PCT/US2016/017900, dated May 27, 2016. 16 pages.
International Searching Authority, International Search Report and Written Opinion issued in International Application No. PCT/US2016/017901, dated Jun. 3, 2016. 13 pages.
International Searching Authority, International Search Report and Written Opinion issued in International Application No. PCT/US2016/017903, dated Jun. 1, 2016. 15 pages.
International Searching Authority, International Search Report and Written Opinion issued in International Application No. PCT/US2016/017904, dated May 23, 2016. 19 pages.
International Searching Authority, International Search Report and Written Opinion issued in International Application No. PCT/US2017/063187, dated Apr. 3, 2018 . 11 pages.
International Searching Authority, International Search Report and Written Opinion issued in International Application No. PCT/US2017/063189, dated May 2, 2018. 22 pages.
International Searching Authority, International Search Report and Written Opinion issued in International Application No. PCT/US2017/063190, dated May 3, 2018. 18 pages.
International Searching Authority, International Search Report and Written Opinion issued in International Application No. PCT/US2017/063191, dated Mar. 21, 2018. 12 pages.
International Searching Authority, International Search Report and Written Opinion issued in International Application No. PCT/US2017 /063192, dated Apr. 19, 2018. 12 pages.
International Searching Authority, International Search Report and Written Opinion issued in International Application No. PCT/US2017/063193, dated Feb. 16, 2018. 12 pages.
Second Office Action issued in Chinese Patent Application No. 201680021337.8, dated Nov. 4, 2019. 3 pages. [Chinese language].
Second Office Action issued in Chinese Patent Application No. 201680021337.8, dated Nov. 4, 2019. 4 pages. [English language translation].
Third Office Action issued in Chinese Patent Application No. 201680021337.8, dated Jul. 23, 2020. 11 pages. [Chinese language].
Third Office Action issued in Chinese Patent Application No. 201680021337.8, dated Jul. 23, 2020. 20 pages. [English language translation].
First Office Action issued in Chinese Patent Application No. 201780084613.X, dated Sep. 9, 2021. 11 pages. [Chinese language].
First Office Action issued in Chinese Patent Application No. 201780084613.X, dated Sep. 9, 2021. 21 pages. [English language translation].

\* cited by examiner

310

```
<svg width = "640" height = "480" xmlns=http://www.s3.org/2000/svg>
    <g>
        <rect x="100" y="100" fill="#000000" width="300" height="150" fill-opacity="0" stroke="000000"/>
    </g>
</svg>
```

Fig. 3A

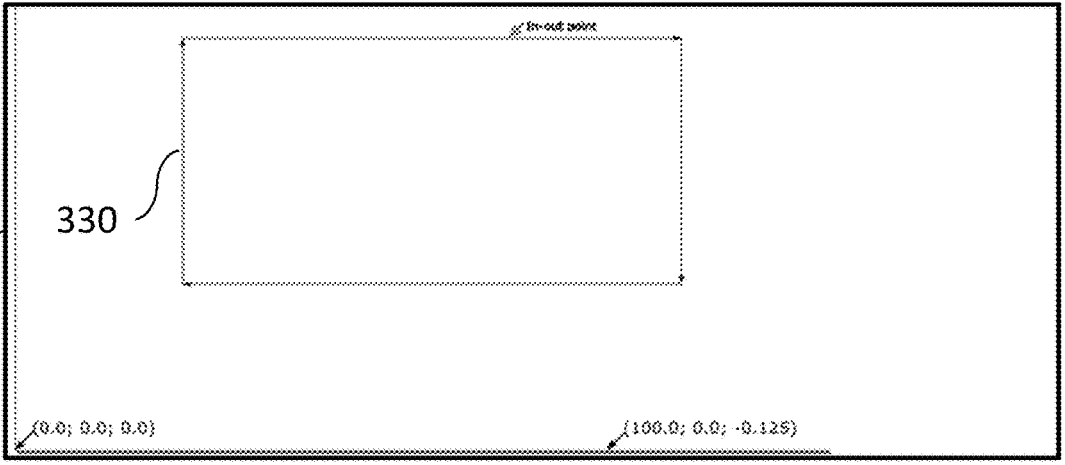

```
%
(Header)
M3
(Header end.)
G21

(Start cutting path id: rect3336)
(Change tool to Default tool)

G00 Z5.000000
G00 X28.362631 Y70.415140

G01 Z-0.125000 F100.0(Penetrate)
G01 X112.748481 Y70.415140 Z-0.125000 F400.000000
G01 X112.748481 Y28.362624 Z-0.125000
G01 X28.362631 Y28.362624 Z-0.125000
G01 X28.362631 Y70.415140 Z-0.125000
G00 Z5.000000

(End cutting path id: rect3336)

(Footer)
M5
G00 X0.0000 Y0.0000
M2
(Using default footer. To add your own footer create file "footer" in the output dir.)
(end)
%
```

Fig. 3C

Project preview i. Text on 3D object
ii. De-warped text applied to flat surface
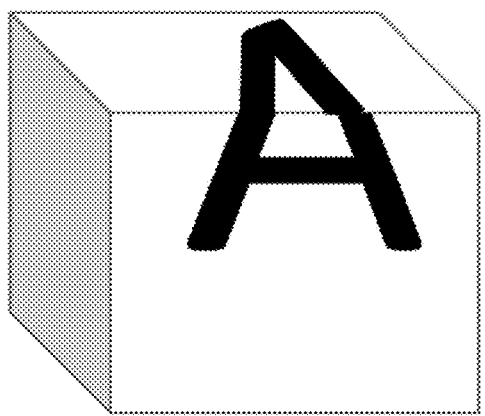
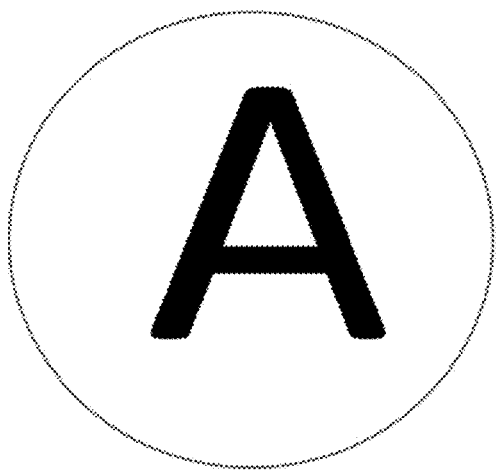
Fig. 13

Source image  Raw representation captured by optics  Algorithmic interpolation of linearity

FABRICATION WITH IMAGE TRACING

CROSS REFERENCE TO RELATED APPLICATION

This application is a continuation of U.S. patent application Ser. No. 15/823,502, filed on Nov. 27, 2017, which claims priority to U.S. Provisional Application No. 62/426,425, filed on Nov. 25, 2016, the contents of each of which are incorporated herein by reference in their entireties.

TECHNICAL FIELD

The subject matter described herein relates to machining a reproduction of an image onto material in a computer-numerically-controlled machine.

BACKGROUND

Automated manufacturing systems such as, for example, computer numerically controlled (CNC) machines, can be used to create objects with a level of detail and precision that far exceeds what is achievable using traditional manufacturing techniques like moldings and/or manual assembly. Such automated manufacturing systems can operate based on instructions specifying, for instance, the cuts, layers, patterns, and/or the like, that should be applied to a material. These instructions can be in the form of computer files transferred to the memory of a computer controller coupled with the automated manufacturing system. Furthermore, these instructions can be interpreted at runtime to effect a series of steps in the manufacturing process.

SUMMARY

In one aspect, a method for implementation by at least one programmable processor includes creating an image file from an image captured by at least one camera that is part of a computer-numerically-controlled (CNC) machine. The method can also include generating a preview having a representation of at least part of a material that is positioned within a working area of the CNC machine. The representation includes an overlay of one or more cuts superimposed on the at least part of the material to indicate an appearance of the material that will result after processing of the material by the CNC machine caused by execution of a machine file generated from the image file.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, enabling the conversion of electronic images (taken with a camera or supplied from an external source) to be reproduced by machining a material with the CNC machine. The images can be modified by a user, digitally corrected/enhanced, and machine instructions specified for designated portions of the image.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to laser fabrication using image tracing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A is a diagram illustrating one example of an SVG source file, consistent with some implementations of the current subject matter;

FIG. 3B is an example of a graphical representation of the cut path in the CNC machine, consistent with some implementations of the current subject matter;

FIG. 3C is a diagram illustrating the machine file corresponding to the cut path and the source file, consistent with some implementations of the current subject matter;

FIG. 13 is a diagram illustrating the removal of distortions from an image, consistent with some implementations of the current subject matter;

When practical, similar reference numbers denote similar structures, features, or elements.

DETAILED DESCRIPTION

Figure 1:
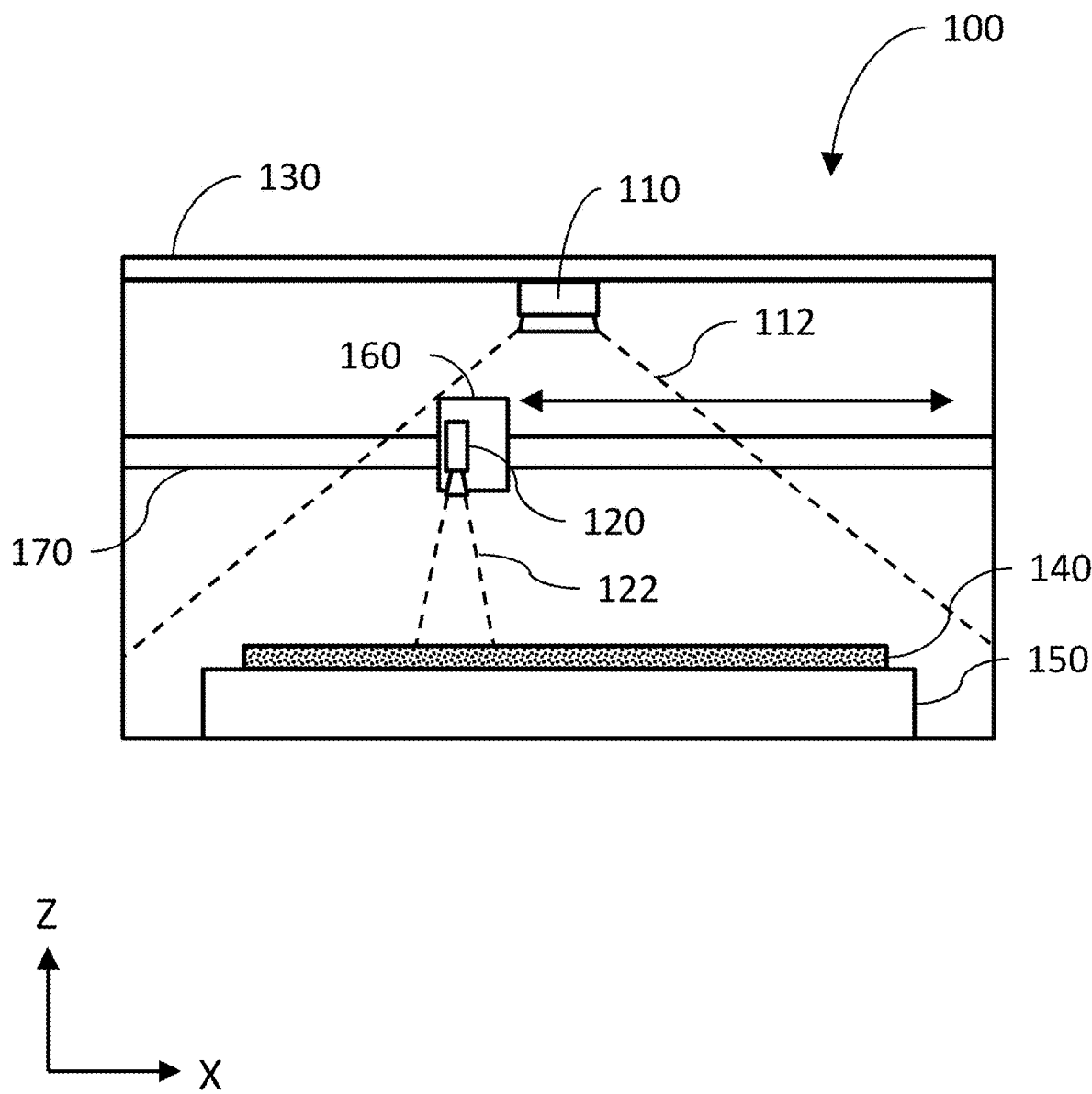
FIG. 1 is an elevational view of a computer-numerically-controlled (CNC) machine with a camera positioned to capture an image of the entire material bed and another camera positioned to capture an image of a portion of the material bed, consistent with some implementations of the current subject matter.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3D printer, then the material is either the current layer, or previously existent layers or substrate, of an object being crafted by the 3D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

Figure 2:
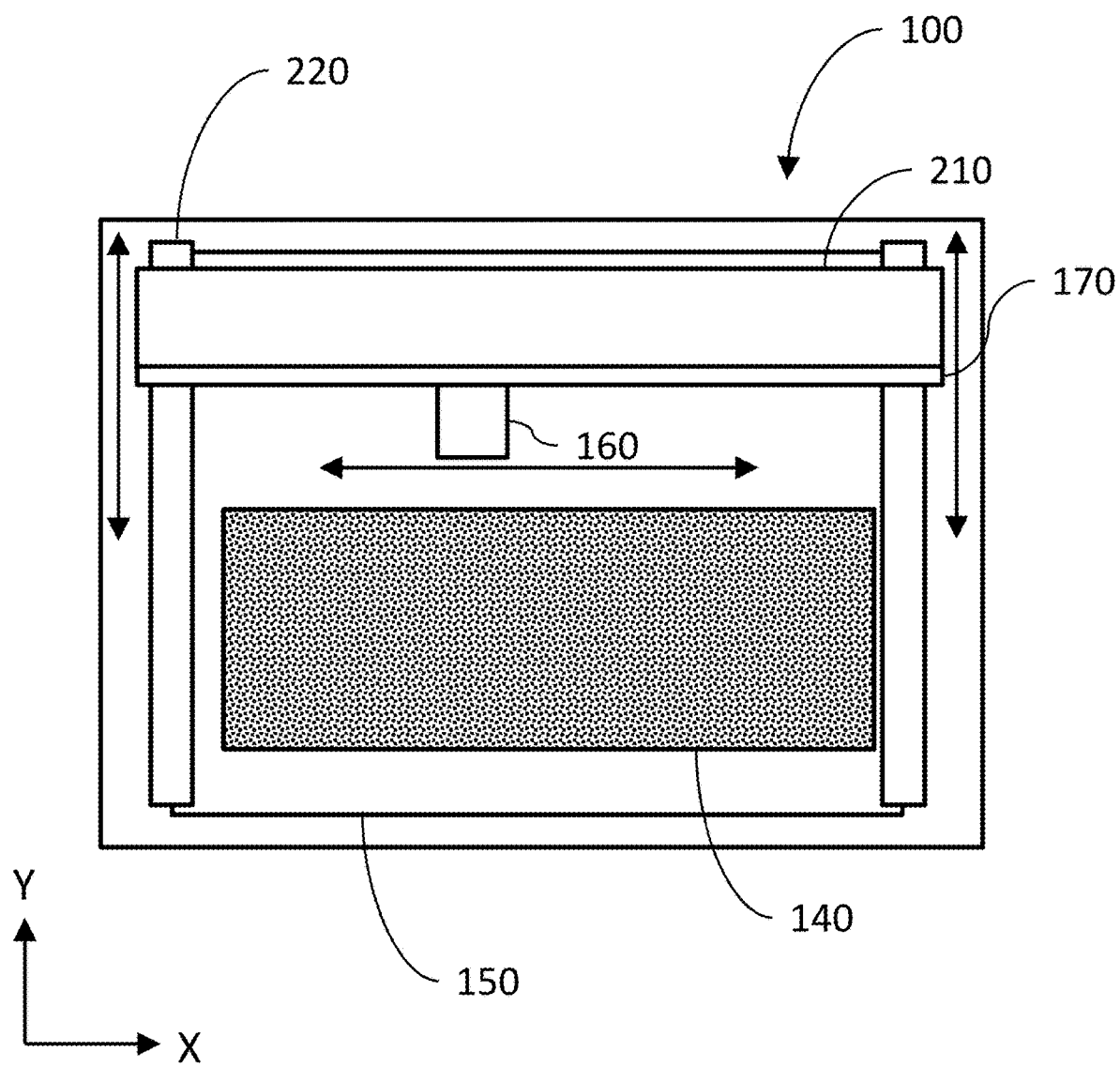
FIG. 2 is a top view of the implementation of the CNC machine shown in FIG. 1.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc.

There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in2 volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP) or it may be arranged as a cloud-based, distributed system. The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can perform edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
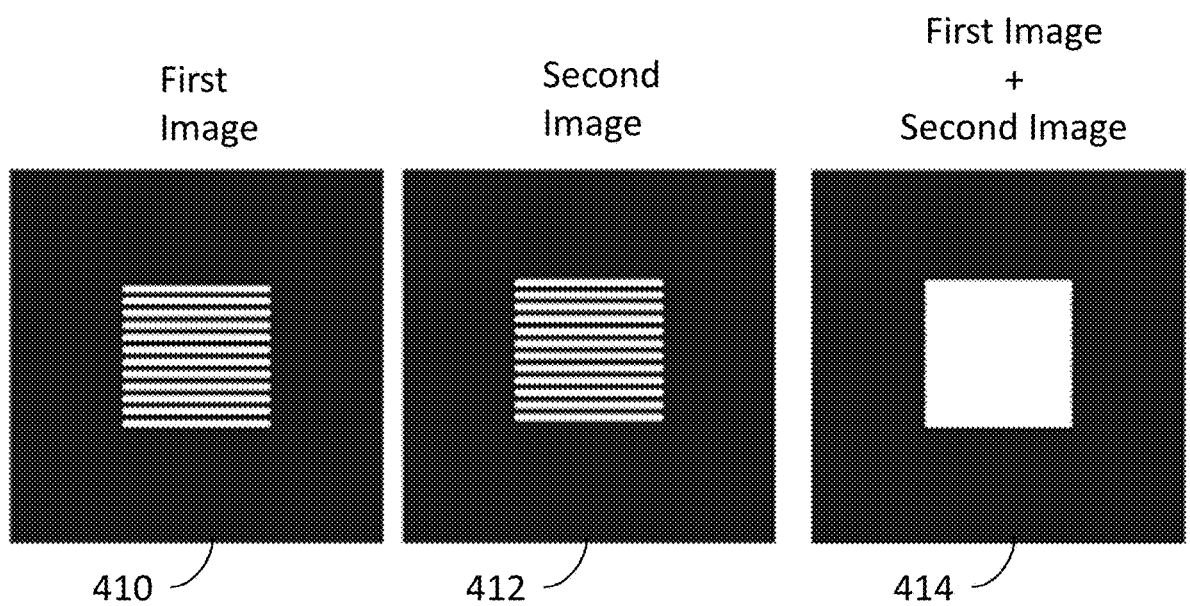
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
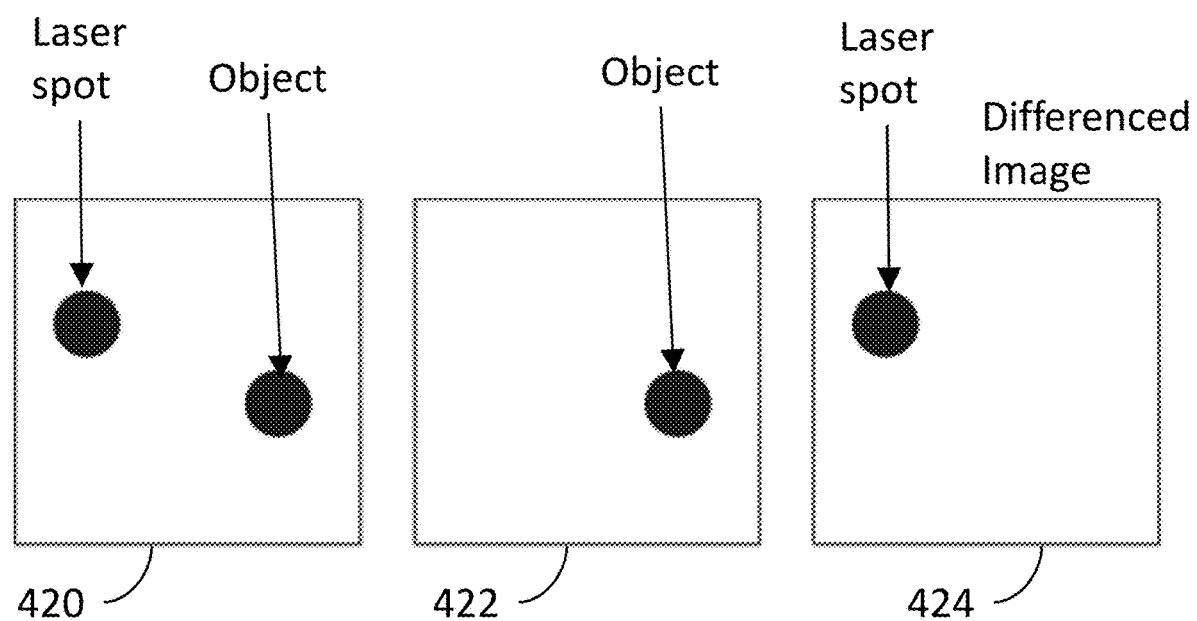
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
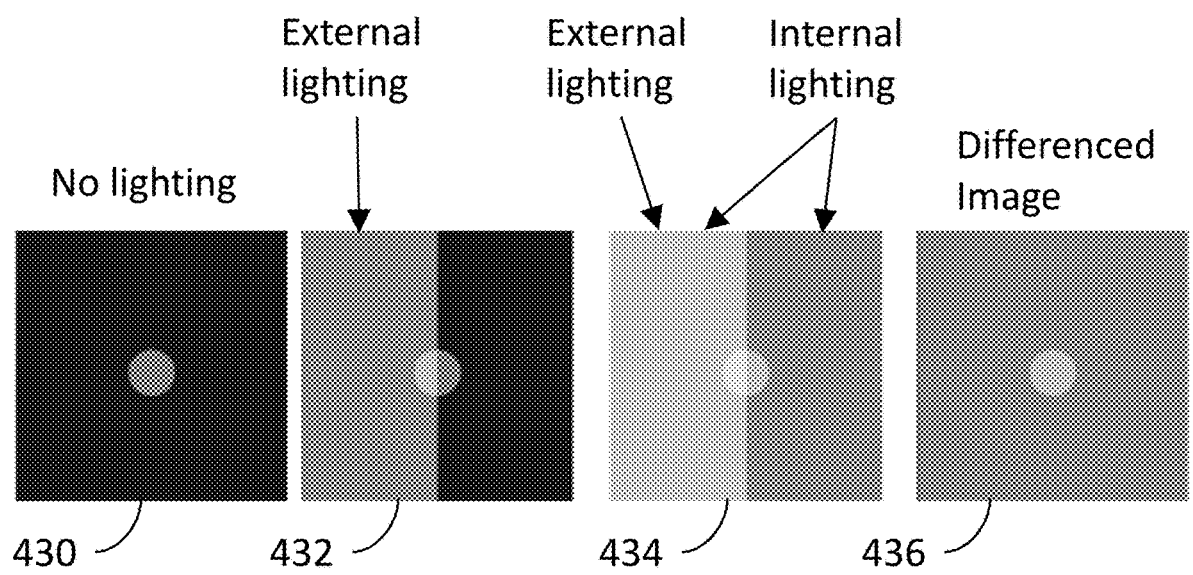
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $\frac{1}{60}$th of a second, or less than $\frac{1}{120}$th of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

As used herein, the term "pattern" is intended to refer to features that are independent from any position, orientation, translation, rotation, or the like, of such a pattern. For example, a triangle can be a pattern that is still a triangle even when the triangle is to be cut at any location in the CNC machine, rotated in a software visualization, imaged from an object in the CNC machine or provided in an image from another computing system, etc. A pattern can be transformed by methods that communicate data unrelated to the pattern, such as specifying a location, a translation, or a rotation. For example, a command to shift a location of a pattern by five pixels does not contain any information about the pattern being shifted, other than the change in location. A pattern can also be modified by operations that preserve at least a portion of patterns appearance, for example outlining and sharpening. Similarly, a pattern can be scaled, mirrored, filled, colored, distorted (e.g. to correct image aberration), and still refer to the initial pattern. As such the "pattern" does not refer to a fiducial (i.e. a mark, cut, or other reference indicator used to locate and/or orient a pattern that is to be cut or engraved).

Image Aberration Correction

Figure 5:
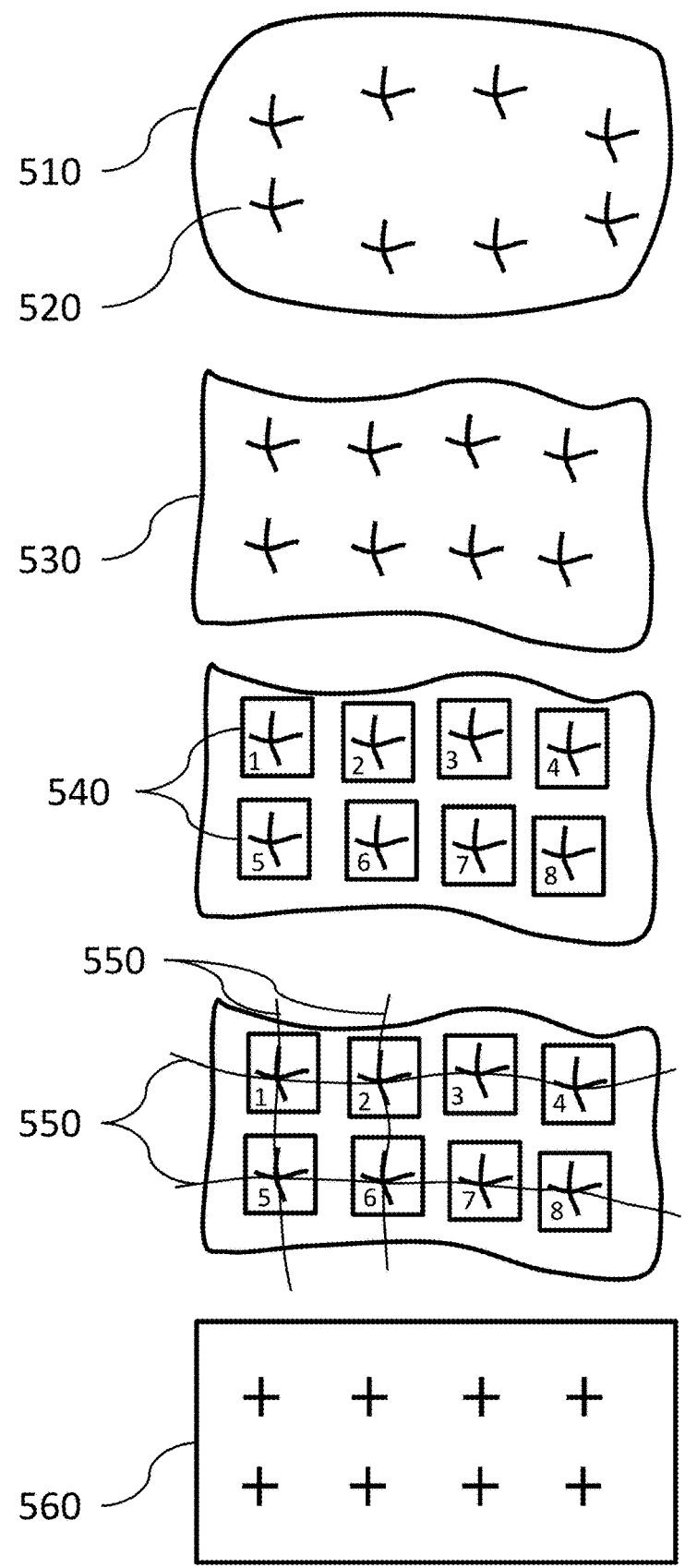
FIG. 5 is a diagram illustrating correcting aberrations in images acquired by a camera with a wide field of view, consistent with some implementations of the current subject matter.

FIG. 5 is a diagram illustrating correcting aberrations in images acquired by a camera with a wide field of view, consistent with some implementations of the current subject matter. A principal challenge of wide-angle imaging inside a small working space with the unit closed is the distortion introduced by the wide-angle lens required. Images from cameras, particularly those with a wide field of view, can suffer from multiple types of distortions. In one implementation, an image correction program can be executed to convert distorted image data 510 (which can be considered to be the sum of a perfect image and a distortion) to corrected image data 560 (which can be either a perfect image or at least an image with reduced distortion). The distortion correction can include processing an image to achieving one or more (or optionally all of) removing the distortion, enhancing the image by increasing contrast, and mapping pixels in the image to corresponding physical locations within the working area, or other areas in the CNC machine. This includes approaches where global parametric models of the camera distortion are applied for enhanced mapping stability. The distortions can be due to optical components in a camera, such as a wide angle lens, the de-centration of an imaging sensor within said lens, chromatic aberrations, reflections or reflectivity, damage or undesirable coatings on the lens, etc. These distortions can be compounded given external factors related to the orientation of the camera 110 with respect to the material bed 150 it is observing as a result of its mount on the lid 130 including the camera's position, rotation and tilt. After making the corrections, the image data can be replaced with, or used instead of, the corrected image data prior to identifying conditions in the CNC machine 100 or performing further image analysis.

In another implementation, the conversion can be performed by imaging one or more visible features 520 shown in the distorted image data. In the example shown in FIG. 5, the visible features 520 can be crosses distributed with a known distance separation across a surface of an object. The distorted image 510, which includes the visible features 520, can be acquired. A partially de-distorted image 530 can be generated by applying a barrel de-distortion function to the distorted image 510. The partially de-distorted image 530 can be separated into smaller images 540, with each of the smaller images 540 including only one of the visible features 520. The plurality of smaller images 540 can be sorted (as shown by the numbering in the smaller images 540), based on coordinates of the visible features 520, into at least one set of visible features, the set of visible features being approximately co-linear. For example, smaller images 1, 2, 3, and 4 can be determined to be co-linear (in the X direction) and smaller images 1 and 5 can be determined to be co-linear (in the Y direction). Mathematical expressions for a line 550 that passes through each of the coordinates can be calculated for each of the set of visible features and based on the coordinates of the visible features 520 in the corresponding set. The line 550 can be, for example, a polynomial fit to the set of visible features 520, a spline, etc. The distorted image data 510, at any point in the image data, can be converted to the corrected image data 560 by applying a correction to the distorted image data 510 based on an interpolation of the mathematical expressions to other points in the distorted image data 510. For example, the interpolation can be between lines 550 that extend in two orthogonal directions (i.e. a grid pattern shown in FIG. 5). The linear distance between the interpolated lines can correspond to less than 5 pixels, less than 3 pixels, or a single pixel. Optionally, coarser interpolation can be used that extends over more pixels than those mentioned previously.

Material Outline

The cameras can also be used to determine the size and outline of material 140 in the CNC machine 100. This allows the user to place material 140 at arbitrary locations within the CNC machine 100 and to use material 140 with unusual shapes, for example scrap material 140 with holes already cut in it.

Additional methods for performing edge detection includes, but is not limited to, selection of contrasting elements in the image gradient (i.e., directional change of intensity in an image), selection or removal of elements in the frequency domain by means a transformation (e.g., Discrete Fourier Transforms), and removal of data likely to be a backdrop (e.g., the CNC machine bed).

Images from the cameras can be compared against images of the device without any material 140. Differencing these images can provide an indication of the material 140, such as an outline or a 3D shape. In another implementation, the bottom of the CNC machine 100 and/or the material bed 150 can be designed to appear in a particular manner to facilitate digital removal from an image. In a further implementation, data removal of the likely backdrop (e.g., the CNC machine bed) may be performed via image derivative analysis, for instance, as shown in FIGS. 6A-I). In another example, the bottom of the CNC machine 100 could be a predetermined color (e.g., green and/or a different color) and that color can be digitally removed from the image to identify the material 140. Alternatively and/or additionally, a "flash" can be used by onboard LEDs to illuminate with a color that would not reflect from the material 140. In another example, the material 140 can be recognized by its appearance and/or by the presence of distinguishing markings. For example, barcodes, unique glyphs, fiducial markers, and/or the like may be placed across the surface of the material 140. The material 140 can be identified based at least on the detection and/or decoding of one or more distinguishing markings including, for example, one or more barcodes, glyphs, fiducial markers, and/or the like.

In one implementation, the material 140 can be pre-coated with ink that reacts to ultraviolet light and/or infrared light such that the material 140 can be identified based on the presence of the ink as indicated by the reaction of the material 140 when subject to different types of illumination (e.g., ultraviolet light, infrared light, and/or the like). In another example, one or more distinguishing markings can be printed on the material 140 with ink that is sensitive to ultraviolet or infrared light. These distinguishing markings can be subsequently subject to the appropriate type of illumination (e.g., ultraviolet light and/or infrared light) and the resulting reaction can be captured with a camera and used to identify the material 140. In another example implementation, the edges of the material 140 can be detected as one or more continuous closed shapes, even when the center of the material 140 might be invisible (e.g., in the case of clear material such as acrylic, glass, and/or the like).

Material Outline Via Image Derivative Analysis

FIGS. 6A-6I are diagrams illustrating determination of a material outline by derivative analysis, consistent with some implementations of the current subject matter. Image derivative analysis can aid in achieving acceptable imagery for material outline detection. A variety of stepwise derivative approaches can be applied, one of which is illustrated in FIGS. 6A-6I. In one implementation, the rate of change of local pixel regions can be measured and/or calculated. Subsequently, a comparison between the pixels can be used to convolve the gradient of the image. Areas and/or locations of large magnitude gradients in the acquired images can be interpreted as edges. The gradient can be determined in a single direction and/or omni-directionally, examples of each are shown in FIGS. 6A-6I.

By combining differencing with gradient detection, the position of edges in a design, an objects, a pattern, and/or the like, can be calculated and stored as additional data and/or coordinates for use in a machine file. The example shown in FIGS. 6A-6I is not intended to be a limiting example. Any of the operations described by FIGS. 6A-6I can be performed in any combination, and in any order. Also, not all of the operations described need occur, and any subset of the operations can be implemented in any order. Furthermore, as described in greater detail below, other features that are described elsewhere in the instant application, such as those not directly related to edge detection, can be implemented when performing edge detection and/or any other operation described herein.

Figure 6A:
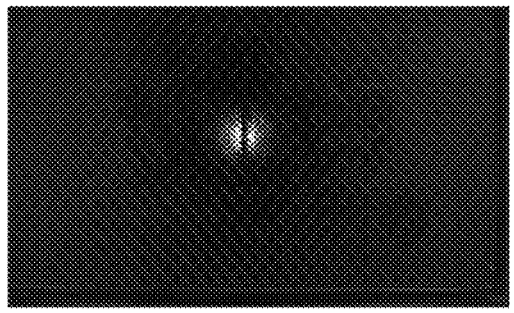
FIG. 6A is a diagram illustrating a distortion-corrected image of the material bed without the material, consistent with some implementations of the current subject matter.

FIG. 6A is a diagram illustrating a distortion-corrected image of the material bed 150 without the material 140, consistent with some implementations of the current subject matter. In some implementations, an image of the material bed 150, without the material 140, can be acquired by any of the cameras inside the CNC machine 100. As discussed herein, some images can be distorted, for example due to a wide-angle lens and/or the angle at which the image is taken. Any of the distortion or aberration correction techniques described herein can be applied to generate a distortion-corrected image of the material bed 150. In the example shown in FIG. 6A, the shape in the center of the image can be any type of aberration and/or distortion including, for example, an artifact, an area of varying light, a reflection, and/or the like.

Figure 6B:
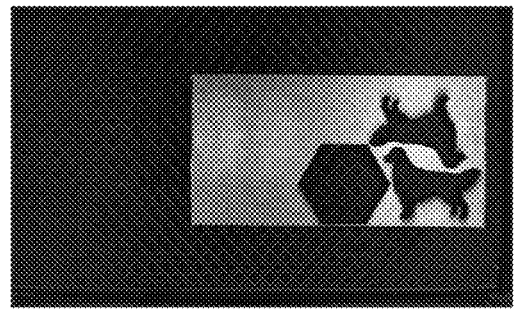
FIG. 6B is a diagram illustrating a distortion-corrected image of the material bed with the material, consistent with some implementations of the current subject matter.

FIG. 6B is a diagram illustrating a distortion-corrected image of the material bed 150 with the material 140, consistent with some implementations of the current subject matter. Similar to that shown in FIG. 6A, a distortion-corrected image of the material bed 150, with the material 140, can be generated. In some implementations, the distortion correction can be the same as that applied to generate the image shown in FIG. 6A. In other implementations, different and/or additional methods of distortion correction can be used based on the material 140 that was added. As shown in FIG. 6B, the material can include several patterns (e.g. two animals and a hexagon) in addition to the rectangular shape of material itself.

Figure 6C:
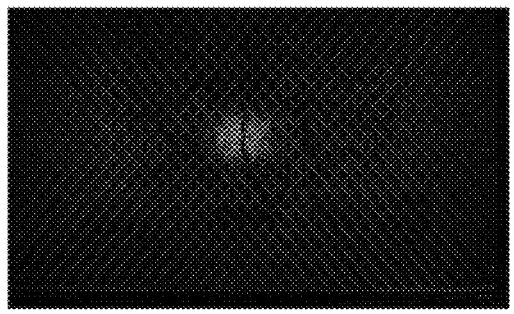
FIG. 6C is a diagram illustrating a high-pass filtered, y-axis-only image gradient of the material bed, consistent with some implementations of the current subject matter.

FIG. 6C is a diagram illustrating a high-pass filtered, y-axis-only image gradient of the material bed 150, consistent with some implementations of the current subject matter. As discussed above, any of the images can be digitally analyzed to calculate a gradient at each pixel in the image. In a two dimensional space, the gradient can be expressed as the sum of the partial derivatives between adjacent pixels in two orthogonal basis directions (e.g. the horizontal direction and the vertical direction). When determining gradients, the intensity of a pixel can be expressed as a numerical value based on, for example, a conversion of the image to a grayscale representation, conversion of the image color to a brightness, and/or the like. The gradient can then be based on the detected change in the intensity between two pixels in the image in the direction between the two pixels. In FIG. 6C, only a portion of the gradient of the image of the material bed 150 in the vertical direction (e.g., y-axis) is shown. In some implementations, the image processing can filter the image to show or indicate only pixels with a gradient and/or a component of the gradient that exceed a threshold value. This can be referred to as high-pass filtering and can be used to distinguish an object, pattern, and/or other shape from a generally non-changing background (e.g. a flat surface of a material bed and/or a face of an object or pattern). Other forms of filtering can also be applied including, for example, bandpass filtering to prevent image saturation where large gradients may be present.

Figure 6D:
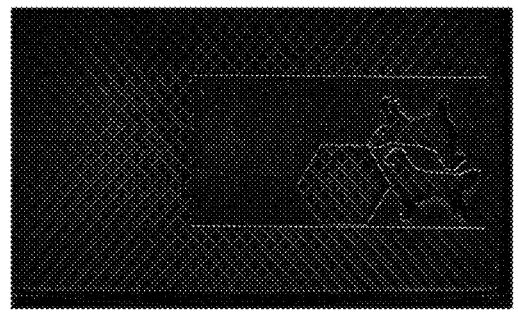
FIG. 6D is a diagram illustrating a high-pass filtered, y-axis-only image gradient of the material bed with the material, consistent with some implementations of the current subject matter.

FIG. 6D is a diagram illustrating a high-pass filtered, y-axis-only image gradient of the material bed 150 with the material 140, consistent with some implementations of the current subject matter. FIG. 6D is similar to FIG. 6C, but shown with the material 140, which includes the patterns shown in FIG. 6B (e.g., the two animals and the hexagon).

Figure 6E:
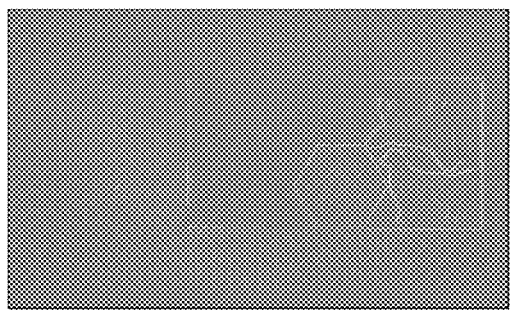
FIG. 6E is a diagram illustrating the high-pass filtered image gradient in all directions, consistent with some implementations of the current subject matter.

FIG. 6E is a diagram illustrating the high-pass filtered image gradient in all directions, consistent with some implementations of the current subject matter. In some implementations, the gradient can be determined based on the change in image intensity in all directions, e.g. the horizontal direction (e.g., x-axis) and the vertical direction (e.g., y-axis). Again, filtering can be applied to exclude pixels where the calculated gradient is below a threshold value and/or not within a specified range.

Figure 6F:
FIG. 6F is a diagram illustrating a high-pass filtered image gradient of a portion of the material bed, consistent with some implementations of the current subject matter.

FIG. 6F is a diagram illustrating a high-pass filtered image gradient of a portion of the material bed 150, consistent with some implementations of the current subject matter. In some implementations, a portion of the material bed 150 can be imaged as described above, instead of imaging the entire material bed 150. Alternatively and/or additionally, an image can be cropped or otherwise reduced to a desired portion or ("swatch") of the material bed 150. This portion can be selected to represent a particularly accurate representation of the material bed 150. The swatch may be indicated by the user, or it may be programmatically determined by software. For example, the software may use a simpler and/or faster algorithm such as, for example, eliminating all black regions, before using a more sophisticated and/or slower algorithm such as, for example, searching for edges in the remaining region. In another example, a characteristic pattern such as, for example, the honeycomb pattern of the tray upon which the material 140 is placed, is used to indicate areas to be removed from the swatch before material detection algorithms evaluate what is remaining.

Figure 6G:
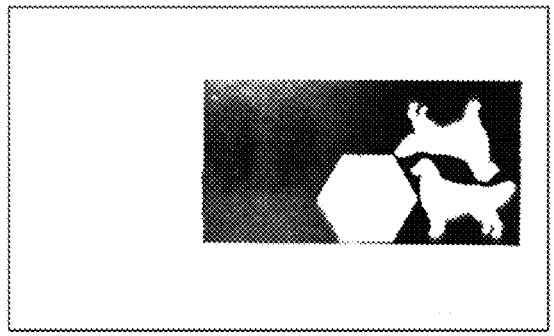
FIG. 6G is a diagram illustrating a degree of matching between the image gradient in all directions shown in FIG. 6E and the image gradient of the portion of the material bed shown in FIG. 6F, consistent with some implementations of the current subject matter.

FIG. 6G is a diagram illustrating a degree of matching between the image gradient in all directions shown in FIG. 6E and the image gradient of the portion of the material bed 150 shown in FIG. 6F, consistent with some implementations of the current subject matter. In some implementations, a comparison and/or a match can be calculated between the gradient calculated for the portion of the material bed 150 in FIG. 6F and the image gradient determined for FIG. 6D. Here, a poor match is present between the material 140 and material bed 150 (e.g. perhaps because the material 140 exhibits variations in surface height which may be the case, for example, if the material is a piece of wood and/or has a slightly curved surface). The other regions, shown by the hexagon and the two animal shapes, have a very similar gradient to that of the material bed (e.g. because they are both flat).

Figure 6H:
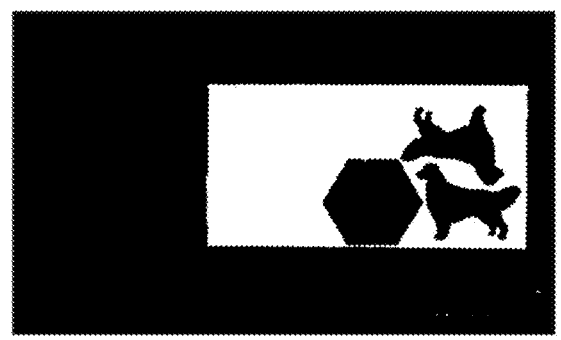
FIG. 6H is a diagram illustrating a thresholded image based on gradient match in FIG. 6G, consistent with some implementations of the current subject matter.

FIG. 6H is a diagram illustrating a thresholded image based on gradient match in FIG. 6G, consistent with some implementations of the current subject matter. To definitively establish the determination of the material edge, or the edge of a pattern or object present in the acquired images, thresholding can be applied to the gradient match described in the example of FIG. 6G. Applying the thresholding can provide a bitwise distinction between objects and/or patterns present in the acquired image.

Figure 6I:
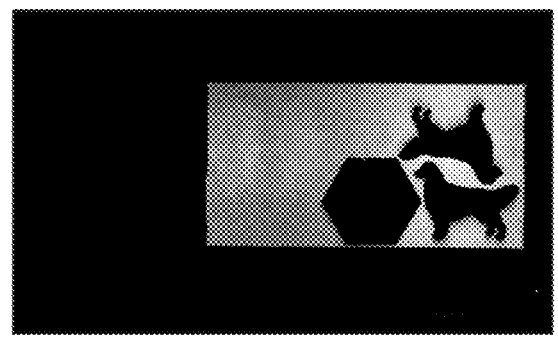
FIG. 6I is a diagram illustrating a final image showing only the material, consistent with some implementations of the current subject matter.

FIG. 6I is a diagram illustrating a final image showing only the material, consistent with some implementations of the current subject matter. Once the objects or patterns present in an image are distinguished from each other by any combination of the above methods, the objects and patterns can be selectively isolated from each other as desired. In this example, the areas of the image that correspond to the patterns (e.g., the animals and/or the hexagon) on the material 140 and/or the material bed 150 can be digitally subtracted from the distortion-corrected image of the material bed 150 with the material 140, as shown in FIG. 6B. As shown here, only the material 140 remains in the image.

Such models, for example those applied in the example shown in FIGS. 6A-6I, can be tuned based on pre-determined or adaptive confidence settings which are programmed to determine what is considered background versus material. Furthermore, these approaches can be underpinned by a variety of methods, including a histogram of gradient (HOG) detector, whereby a swatch sample of a confidently detected area of the image (e.g., an area detected with high confidence to be background), can be passed over every other part of image and compared with respect to how much a given sample appears to be transitioning in a similar manner. Conversely, rather than seeking to detect the image background and/or the material bed 150 of the CNC machine 100, this same approach can be applied to direct detection of the material 140 itself, particularly if the surface properties of the material 140 lend themselves to this purpose (e.g., if the material 140 has a consistent and/or readily-imaged paper cover on its surface). Alternatively and/or additionally, combining multiple detection approaches can provide material outline detection with resolution superior to that provided by either method alone. For example, applications requiring detection of scrap materials that have already been cut in intricate and/or complicated patterns may benefit from a high level of precision in material edge detection to better enable users and/or computer-vision aided algorithms to organize subsequent prints and make optimal use of remaining space on the scrap material.

Interpreting User Intent Via Image Processing

There are multiple strategies and techniques that may be employed to make intelligent decisions with respect to interpreting user intent from traced images in preparation for downstream processing. Such strategies include, for example, techniques for artifact clean-up, edge enhancement, image component recognition, thresholding, and/or the like.

Artifact Clean-Up

Figure 7A:
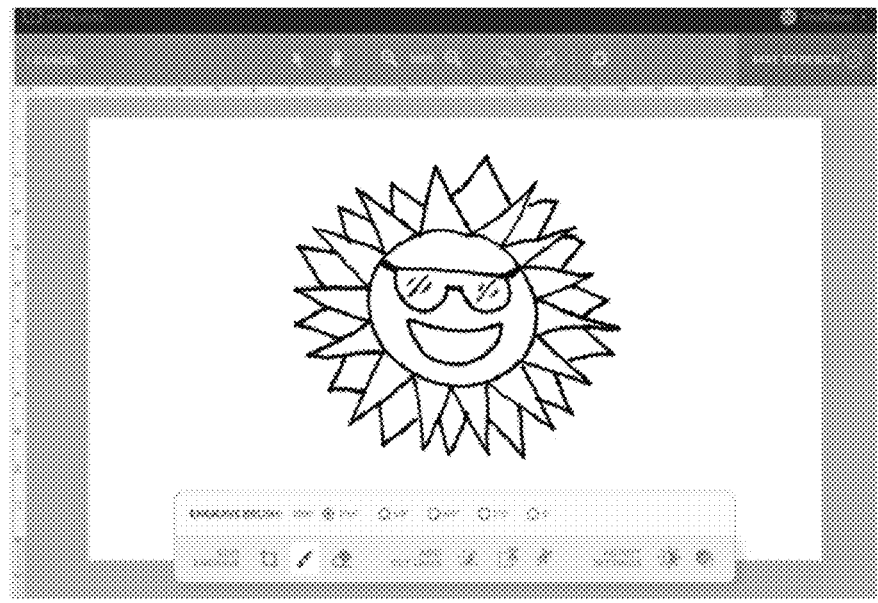
FIG. 7A is a diagram illustrating application of an artifact threshold set too low, consistent with some implementations of the current subject matter.
Figure 7B:
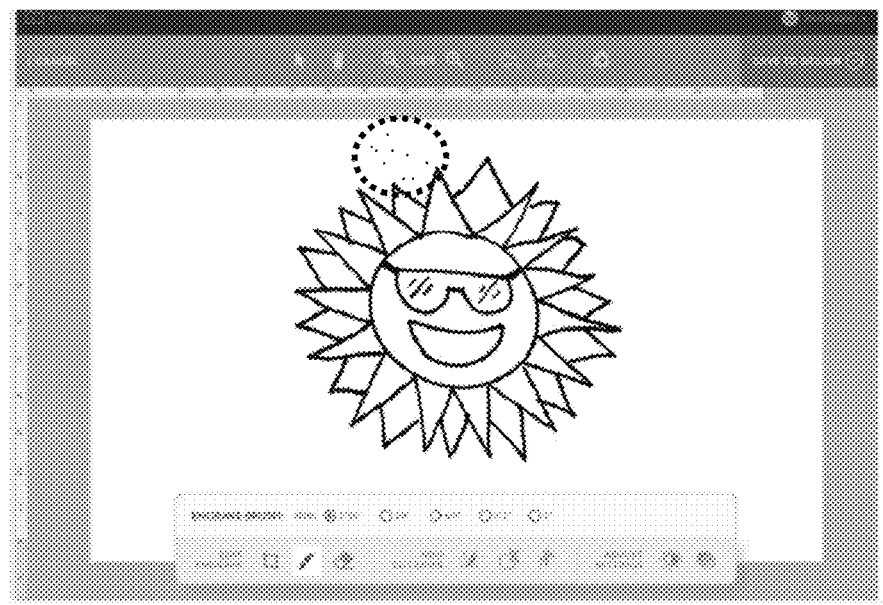
FIG. 7B is a diagram illustrating application of an artifact threshold set correctly, consistent with some implementations of the current subject matter.
Figure 7C:
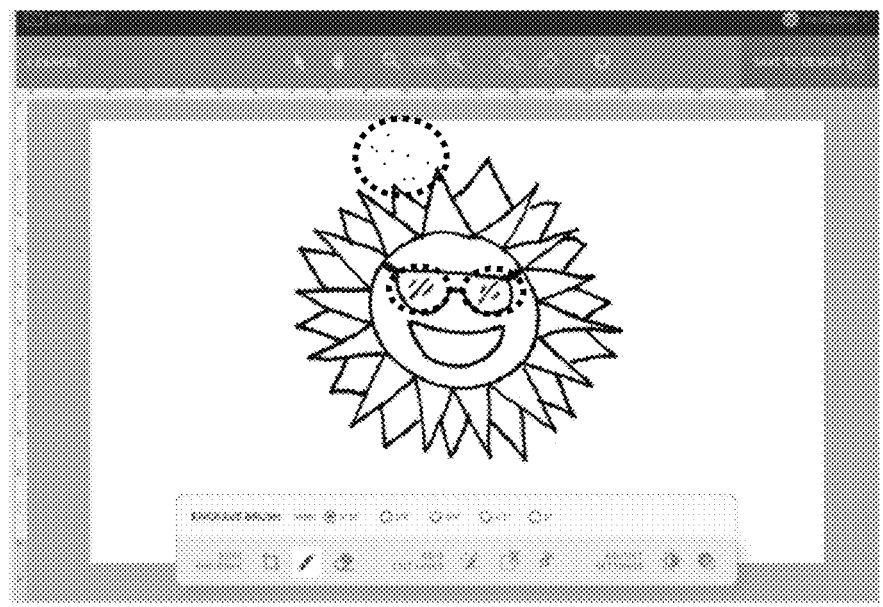
FIG. 7C is a diagram illustrating application of an artifact threshold set too high, consistent with some implementations of the current subject matter.

FIG. 7A is a diagram illustrating application of an artifact threshold set too low, consistent with some implementations of the current subject matter. FIG. 7B is a diagram illustrating application of an artifact threshold set correctly, consistent with some implementations of the current subject matter. FIG. 7C is a diagram illustrating application of an artifact threshold set too high, consistent with some implementations of the current subject matter. Artifacts may be introduced into the image from a range of sources including, for example, lighting conditions (e.g., dark shadows), dust and/or particulate interference, material defects (e.g., folds and/or inconsistencies), and/or the like. Analyses that seek to understand the user's intent for traced images may assist in the probabilistic determination of whether an image detail is more consistent with a component of the desired design, or with an artifact such as a speckle, an unwanted jag, and/or the like (see FIGS. 7A-7C).

Artifact Detection Based on Local Pixel Density

In one implementation, to detect features indicative of the presence of small artifacts such as, for example, dust and/or the like, the image can be searched by an algorithm trained to identify sparse regions in the image. A sparse region in the image may be an area having few pixels (e.g., that correspond to a pattern or design) that is immediately adjacent to another area that is more densely populated with pixels. Alternatively and/or additionally, a spare region in the image may be an area where the physical parameters of the laser would be ineffective at processing that level of detail. For instance, the rate of changes in that area may exceed the capabilities of the laser.

In some implementations of the current subject matter, artifacts can be detected and removed using a "erode and dilate" technique in which local regions of image sparseness are detected and removed from the traced image. The "erode and dilate" technique can be applied to isolate and remove the noise in the image relative to user intent. Alternatively and/or additionally, the "erode and dilate" technique can be applied to remove artifacts from traced lines.

Figure 17:
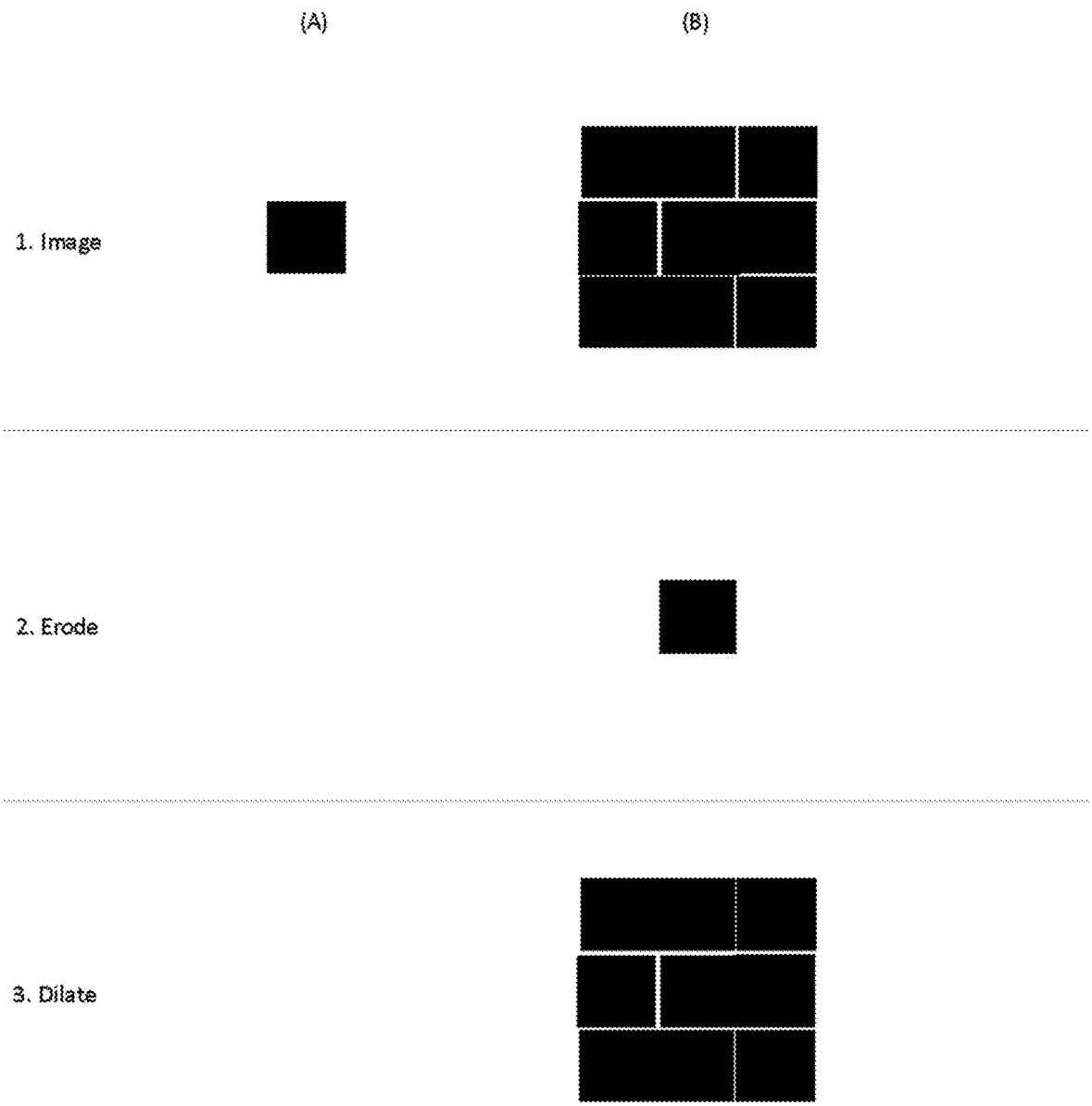
FIG. 17 is a diagram illustrating a "erode and dilate" technique for detecting and removing artifacts, consistent with some implementations of the current subject matter.

To further illustrate, FIG. 17 is a diagram illustrating the "erode and dilate" technique for detecting and removing artifacts, consistent with some implementations of the current subject matter. In the example shown in FIG. 17, a traced source image is eroded by removing a small distance (e.g. a pixel) from every black pixel in the image. This is shown in Panel 1 of FIG. 17, in which a simple exemplar trace image is overlaid with a grid. The optics used in the trace have detected two regions for tracing: (A) a 1-pixel speckle which may have been introduced as noise by any number of imaging anomalies (e.g., lighting and/or drawing artifacts); and (B) the target image to be traced (e.g., a 9-pixel square). The process of erosion shown in Panel 2 of FIG. 17 can be morphological, in that erosion includes selectively removing the exterior-most pixels from the entire traced image. In the case of (A), erosion is a manipulation that causes the speckle to be removed entirely from the trace, whilst the effect on (B) is that the target image is shrunken to a 1-pixel square. The final step in this method is to then dilate the eroded image. In this step, which is shown in Panel 3 of FIG. 17, all elements of the eroded image are expanded by one pixel. This results in sustained removal of the 1-pixel speckle from region (A), and the restoration of the target image in region (B) to its original state.

Artifact Detection Based on Line Thickness and Global Pixel Density

In some implementations of the current subject matter, the artifact threshold can be adjusted to match to the level of detail detected in the design itself. For instance, a more relaxed artifact threshold may be applied to designs with a higher proportion of intricate detail, such as those produced by a fine-tipped pen while a more relaxed artifact threshold may be applied to designs with a lesser proportion of intricate details, such as those produced with a medium or bold pen.

In some implementations of the current subject matter, the average pixel intensity (e.g., greyscale brightness) within a vicinity can be used as a threshold that is applied to individual pixels within that vicinity to determine whether a particular pixel should be considered black or white. The adaptive threshold kernel size used for this approach may be determined using a number of techniques. For instance, the adaptive threshold kernel size can be determined based on the average pixel intensity across every line and column on a theoretical grid overlaid on the traced image. Alternatively and/or additionally, the summation of all black pixels and/or all white pixels can be used as a metric to determine adaptive threshold kernel size.

Regions detected by such methods as image artifacts can be flagged for manual and/or automatic removal. Multiple representations of a traced image applying various artifact acceptance thresholds, for instance, as shown in FIGS. 7A-7C, can be presented to the user for selection. Alternatively and/or additionally, the algorithm itself may automatically assess the image and decide which representation to select. Once the image is assessed and a specific artifact threshold is determined, the image used to generate the motion plan can be replaced by the representation corresponding to the selected artifact threshold. The motion plan can then be generated based on the selected representation, or the selected representation can be further processed or manipulated before generating the motion plan.

Edge Enhancement

Figure 8A:
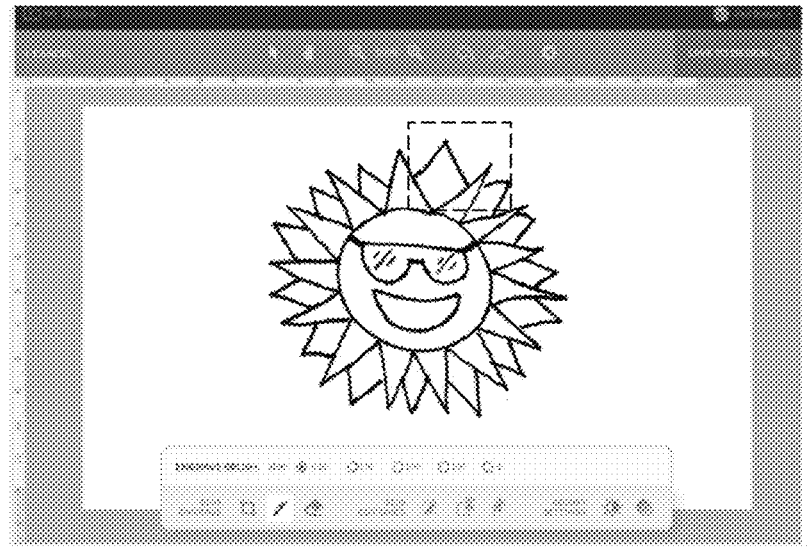
FIG. 8A is a diagram illustrating a region of an image where edge enhancement can be applied, consistent with some implementations of the current subject matter.
Figure 8B:
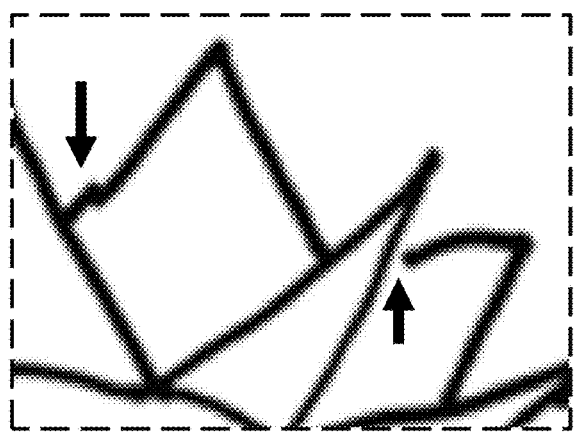
FIG. 8B is a diagram illustrating an expanded view of a portion of FIG. 8A, highlighting two areas for corrections, consistent with some implementations of the current subject matter.
Figure 8C:
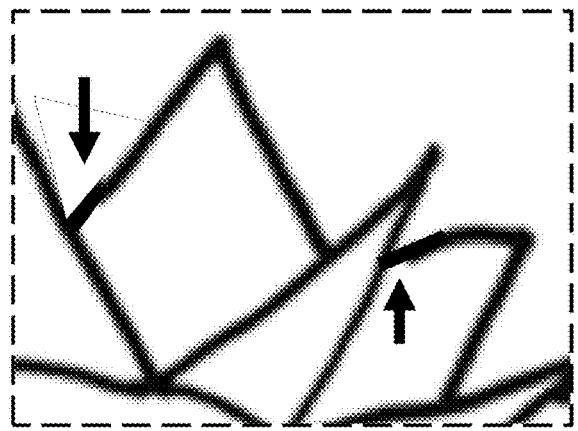
FIG. 8C is a diagram illustrating the features of FIG. 8B after edge enhancement has been applied, consistent with some implementations of the current subject matter.

FIG. 8A is a diagram illustrating a region of an image where edge enhancement can be applied, consistent with some implementations of the current subject matter. FIG. 8B is a diagram illustrating an expanded view of a portion of FIG. 8A, highlighting two areas for corrections, consistent with some implementations of the current subject matter. FIG. 8C is a diagram illustrating the features of FIG. 8B after edge enhancement has been applied, consistent with some implementations of the current subject matter. Similar to the approaches described above for artifact detection, the lines and/or edges of an imaged design may be assessed algorithmically for certain properties including, for example, smoothness, completeness, consistency with surrounding edges, simplicity, and/or the like. Furthermore, one or more corrective algorithms may be applied to these lines and/or edges in order to achieve one or more of these properties (e.g., smoothness, completeness, consistency with surrounding edges, simplicity, and/or the like). Table 1 below provides a description of the algorithms that can be used to assess and/or achieve one or more of the aforementioned properties.

TABLE 1

Figure 24:
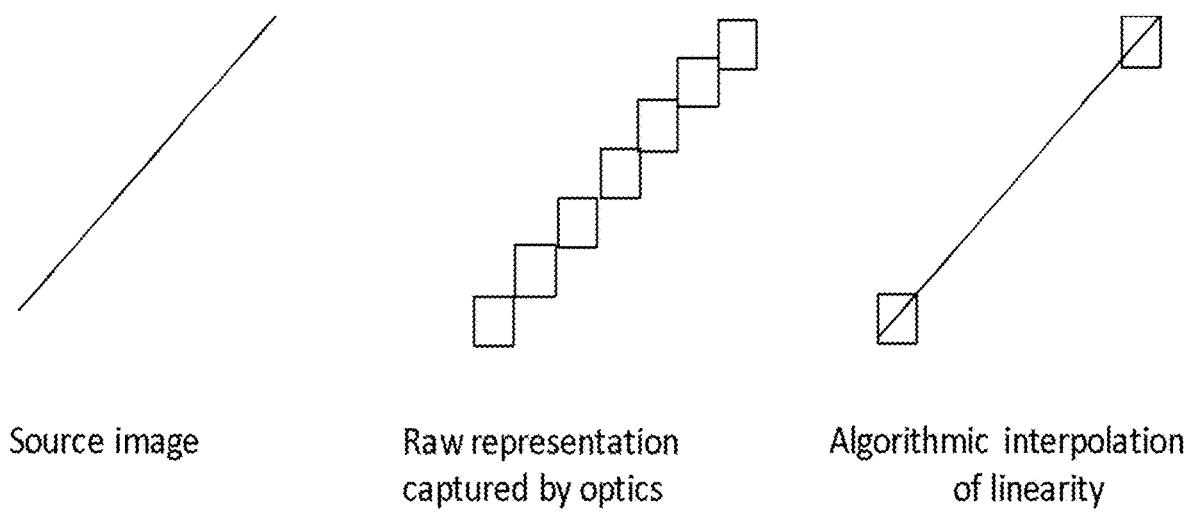
FIG. 24 is a diagram illustrating how a smoothing algorithm may be applied to analyze the differential of the change of a diagonal line drawn in fine pen by a user, which may be captured by the optical system as a pixelated path, to determine when intermediate points of information may be confidently ignored in favor of interpolating a single line across a given area.

| Property | Description of Algorithm and Corresponding Application |
| --- | --- |
| Smoothing | Algorithms that analyze for changes that are consistent across an area of pixels and interpolates a path within some degree of confidence. For example, a diagonal line drawn in fine pen by a user may be captured by the optical system as a pixelated path. A smoothing algorithm may be applied to analyze the differential of the change of the line to determine when intermediate points of information may be confidently ignored in favor or interpolating a single line across a given area. See FIG. 24. |
| Completeness | Algorithms that analyze images by row and column to detect when clusters of pixels with particular trajectories that separated only by narrow gaps. The algorithm analyzes the vector of the initial cluster and the vector of another cluster; if the gap is below a particular confidence threshold, the trace algorithm will instruct this area to be filled. For example, a drawn letter "O" that is not fully connected when drawn in pen may be automatically completed using this algorithm. |
| Consistency with Surrounding Edges | Similar to completeness, but clusters do not necessarily have to have the same trajectory, or column or row of data clusters. For example, consistency algorithms may seek to make connections from traced components situated at right angles to each other, may look for consistency of shape, lighting, etc. It may also trigger re-analysis of the adaptive threshold; for example, if the consistency algorithm detects a partial line or shape, but lacks sufficient data, it may prompt the software to re-compute the raw data using a different adaptive threshold. |
| Simplification | Analyzing traced lines for complexity; e.g. for lines intuited as straight, removal of any additional points along pixels within that straight line such that only the outer two points remain. |

In some implementations of the current subject matter, multiple remedies may be available for correcting an inconsistency, aberration, and/or distortion in an image. Alternatively and/or additionally, where the image is subject to sophisticated analysis, there may be less certainty in the outcome of the analysis (e.g., the identification of a particular inconsistency, aberration, and/or distortion), which can prevent the automatic selection of one or more remedies. As such, instead of automatically performing a manipulation to correct the inconsistency, aberration, and/or distortion in the image, a user of the CNC machine 100 may be provided, via a user interface for example, a selection of the different remedies that can be applied to correct the image. The user can select one or more of the different remedies offered to the user via the user interface. Alternatively and/or additionally, the user can create a customized remedy, for example, based on one or more of the remedies presented to the user via the user interface.

Figure 18:
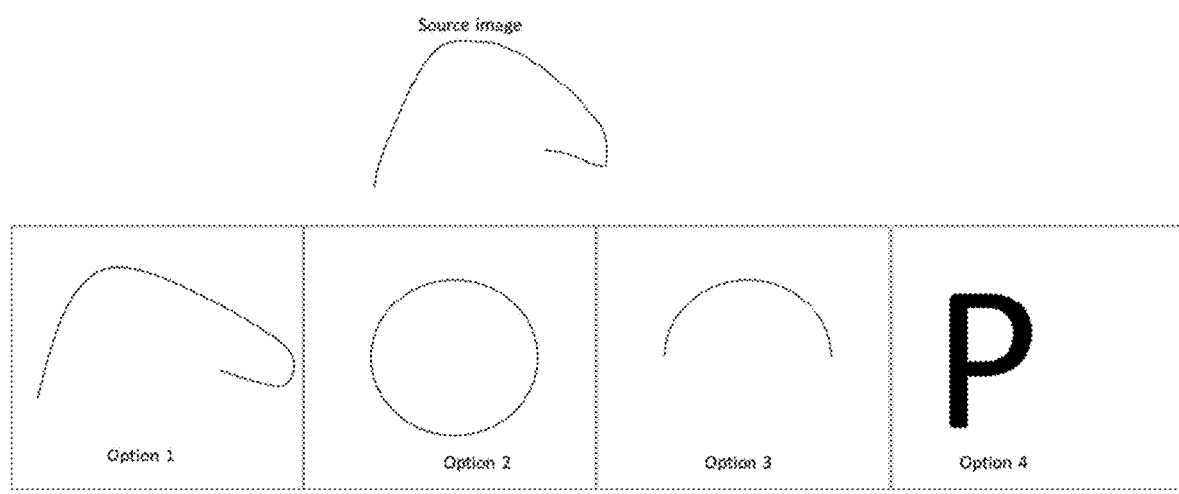
FIG. 18 is a diagram illustrating a user interface displaying different remedies for correcting an inconsistency, aberration, and/or distortion in an image, consistent with implementations of the current subject matter.

To further illustrate, FIG. 18 is a diagram illustrating a user interface displaying different remedies for correcting an inconsistency, aberration, and/or distortion in an image, consistent with implementations of the current subject matter. As shown in FIG. 18, the user interface can present four options for correcting an inconsistency, aberration, and/or distortion in a source image. As noted, to correct the inconsistency, aberration, and/or distortion in the source image, the user can choose one or more of the four options and/or create a customized remedy based on one or more of the four options.

Alternatively and/or additionally, as shown in FIGS. 8A-C, inconsistencies, aberrations, and/or distortions can be corrected automatically, for example, upon detection. In cases where a remedy is selected automatically, each available option can be computed and subjected to a ranking system. This ranking can be based on factors such as, for example, probabilistic data (e.g., indicating which analyses can be applied with the greatest degree of confidence), historical data (i.e., indicating the historical rate of success of each remedy), and/or the like.

Image Component Recognition

Figure 9A:
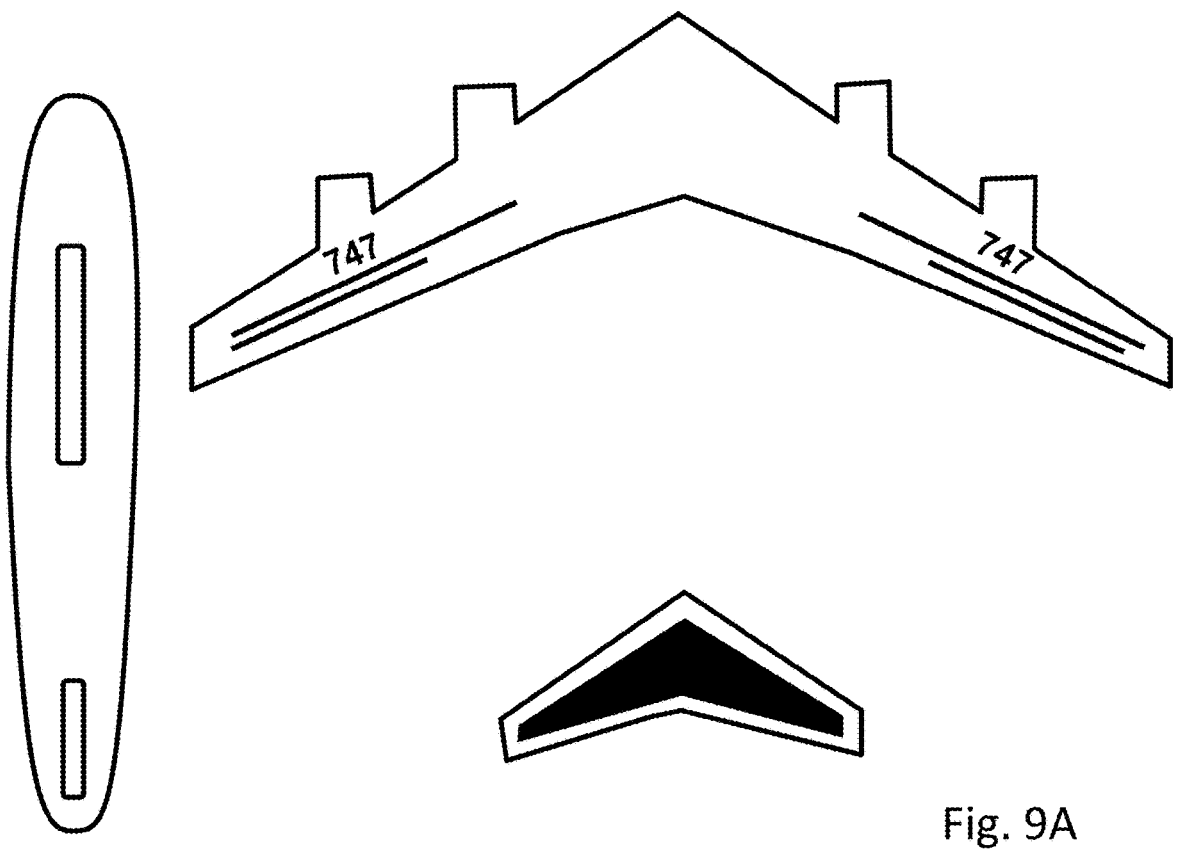
FIG. 9A is a diagram illustrating an image with components corresponding to different types of desired cuts, consistent with some implementations of the current subject matter.
Figure 9B:
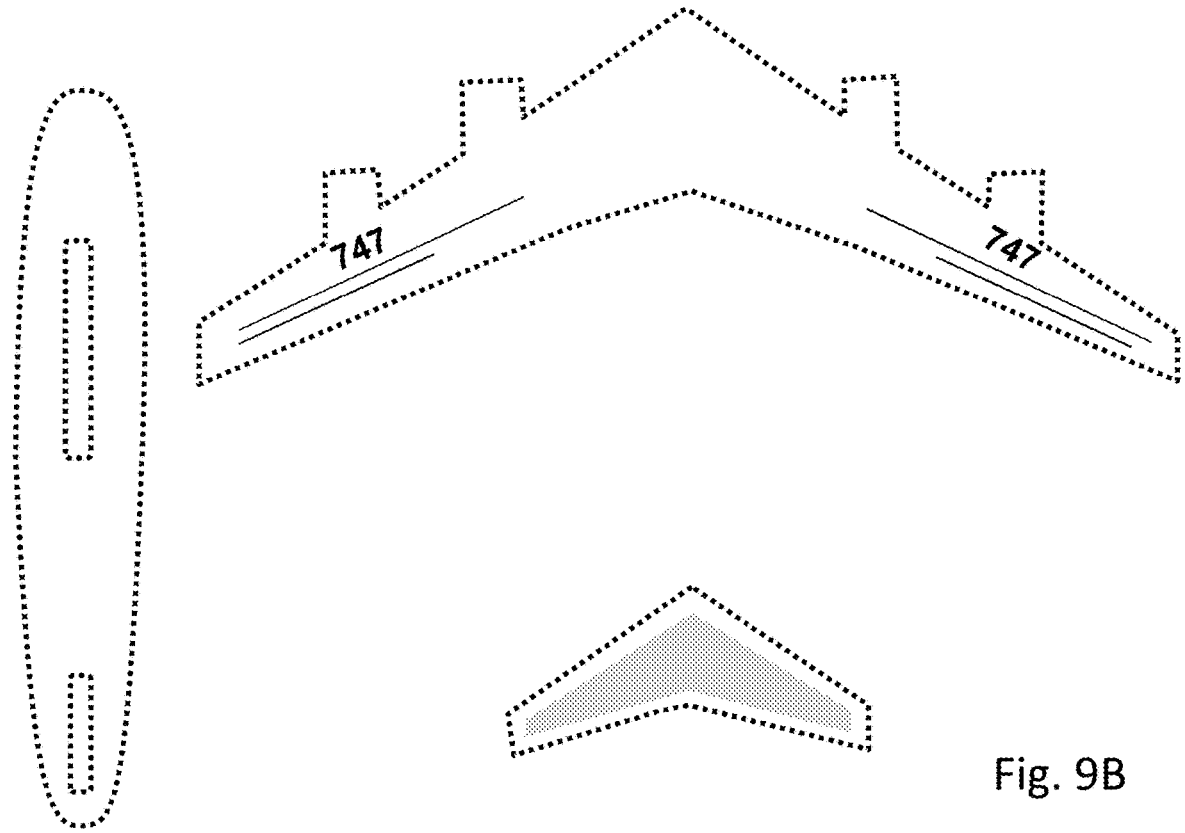
FIG. 9B is a diagram illustrating a visual example of machine instructions based on identifying of the components identified from the image of FIG. 9A, consistent with some implementations of the current subject matter.

FIG. 9A is a diagram illustrating an image with components corresponding to different types of desired cuts, consistent with some implementations of the current subject matter. FIG. 9B is a diagram illustrating a visual example of machine instructions based on identifying of the components identified from the image of FIG. 9A, consistent with some implementations of the current subject matter. There are many kinds of components that the vision-system can recognize to effectively compute sensible machine processing solutions for users. A design can have components, for example, outer lines, inner lines, and filled in areas (solid or pattern filled to indicate a desired etch/engrave). In one implementation, the image can be searched for such components by a variety of methods that may seek to delineate such areas from one another with confidence and provide intelligent default settings for the most appropriate action for given components.

In some implementations, various components can be identified by the image processing software, for example, solid lines, dashed lines, lines of specified thickness or within a particular thickness range, interior lines, exterior lines, areas of solid fill, areas of pattern fill, lines of a particular color, etc. A particular type of machine instruction can be generated based on the identified components, for example, cutting, engraving, scoring (cutting to a specified depth (e.g. less than 25%, 50%, or 75% of the local material thickness) to enable the piece to be easily separated from another portion of the material), perforating, or the like. Any type of cut or machine instruction can be paired with any identified component. The particular pairing can be specified by user-supplied instructions at a graphical user interface or received from another computing device in the form of a data file assigning the pairings. In other implementations, the computer may automatically pair the identified component to the machine instruction based on a default set. For example, all exterior lines can be prepared as cut marks, all interior lines may be scores, and all filled areas may be engraved using gradient-matched settings.

Certain components can also default to special analysis and/or processing conditions in order to intelligently vectorize user intent. For example, text recognition can be applied to the image to identify areas containing text that can benefit from special edge enhancements or machine settings.

Alternatively and/or additionally, object recognition may be employed to detect components within a design and make informed procession decisions as defaults. Such approaches may leverage kernel or swatch-based search methods in conjunction with image databases and recognition keys. Alternatively and/or additionally detectors may search in the frequency domain to identify regions of commonality and/or difference. This approach may be particularly useful in distinguishing between filled areas and non-filled areas. A histogram analysis can also be conducted on image cross-sections in order to separate the components of a complicated image into smaller portions.

In some implementations of the current subject matter, histogram analysis can be applied when performing a targeted search, for example, of something having one or more known characteristics. For instance, histogram analysis can be used to detect a red laser diode when Light Detection and Ranging (LIDAR) is used for material height sensing. Here, a histogram analysis of the red light intensity across the columns and rows of a given area is performed. The intersection of the peaks of red light identified can provide the location of the red dot laser.

In some implementations of the current subject matter, a swatch-based search technique can be used to identify and/or locate a known image. The swatch-based search can include cross-correlating images taken by the CNC machine 100 with the source or image template. The source image may be slid digitally over the image in question to ascertain positional information. The resulting location that returns the highest value of correlation (i.e., the pixels provide the best match) can define the actual location. For instance, one application of a swatch-based search includes using a fiducial marker on the head 160 of the CNC machine 100 for homing the head 160 to a calibrated position within the CNC machine 100.

In some implementations of the current subject matter, a frequency based search can include convolving an image with a kernel and using the resulting data to identify the high frequency components of the image. For example, if the traced image is a simple checkerboard pattern, regions of similarity and/or difference can be identified by looking for sudden changes along the y axis (i.e. high frequency jumps from black to white would be observed). By convolving this information with a kernel that derives the y-axis edges, a map of intensity and/or likelihood of the edges along the y-axis can be created. The same technique can also be applied along the x-axis to create a map of intensity and/or likelihood of edges along the x-axis. The map for the x-axis can be combined with the map for the y-axis to build up a picture of shape.

According to some implementations of the current subject matter, various components of text, objects, foreground and background imagery, in addition to how they are situated in relation to one another, can also be analyzed, for example, using one or more machine learning algorithms, to gain a probabilistic understanding of user intent. For instance, probabilities can be assigned to various outcomes and prioritized decisions can be made based on these assigned probabilities.

Fine-Tuning Material Outline with Adaptive Thresholds

Data from the image that is identified through various analyses as "background," may be temporarily or permanently cropped to facilitate downstream machine vision-driven image processing activities, reducing processing overhead and required memory resources. This cropping may occur in bulk and/or in stages. As used herein, bulk cropping may refer to a general, broad-brush crop that is performed at a faster computational speed. By contrast, staged cropping can refer to a higher resolution crop in which multiple adaptive thresholds can be applied to different local regions within an image and/or to determine identify areas within an image that can be traced as separate objects as well as moved and/or manipulated independently.

Furthermore, this cropping may include the use of adaptive thresholding, whereby different confidence settings are applied to different regions of an image based on some pre-entered or vision-detected knowledge of user intent. Different thresholds may be applied to fine-tune regions where relative acceptance has been established, but where adaptive threshold may be useful in providing a determination of where the material outline is. For example, areas deemed with high confidence to be background, may be eliminated early to allow areas of lower confidence to be the focus of adaptive thresholding approaches. This has potential utility both in better material outline detection, as well as greater downstream image processing accuracy.

An image can be analyzed to detect one or more regions of the image that may require special adjustments relative to other parts of the image to deliver an optimal output. For example, regions designated as background components of a design may require different analyses compared to foreground design elements to deliver optimal interpretation of user intent for improved downstream processing. Similarly, the dark areas of an image can benefit from different thresholding than lighter regions. In one implementation, this can result in user-configurable or automated tools that adapt and adjust to produce optimal downstream processing settings. An example of this can be in applications relating to bitmap processing, where a greyscale image can be analyzed and the most appropriate machine settings that will produce a compatible color and/or shading range that the laser can provide for the given design, taking into consideration constraints of the design, the material, the laser, the duty cycle of the machine or other machine components, etc. For example, to convert intensities in a grayscale image into machine instructions for execution by the CNC machine 100, each pixel intensity can be normalized to a value between 0, which may correspond to white, and 1, which may correspond to black. Machine instructions can be generated based on these normalized pixel intensity values. For instance, the machine instructions can cause the CNC machine 100 to cut to different depths within the material 140 in accordance with the normalized pixel intensity value.

Contrast alternations, for example use of Global Histogram Equalization may be effective methods for improving detail and downstream processing results when users are working with grey images with a limited color range. The adjustment of contrast may be performed at the user's direction or via automated vision-based decisions. For example, the system may detect local areas that differ in their maximum and minimum contrast values and seek to stitch together regions in ways that better align with the user intent. Here, separate vector areas can be generated for each sub-divided region of an image such that different analyses and/or thresholding can be applied to each sub-divided region.

Differing levels of sophistication may be applied to thresholds that are used in imaging; these may range from the simplest use of a raw image, or a raw image with a set threshold, through to solutions that can involve some level of user input (e.g., user toggles plus or minus settings at a user interface to adjust particular threshold values until they are satisfied with the visual result), or whereby such adjustments are made via changing the contrast either by hand or via automation based on some useful knowledge (e.g. desirable histogram properties). This implementation also extends to machine learning approaches, which for example, may employ sampling methods, or leverage local or global repositories of historical image and print data to generate models of intelligent decision-making with respect to interpreting user intent for a traced image. For example, when faced with a new design, the system may apply machine-learned probabilistic models that intuit the likely image category and components and then recommend the most likely settings to derive printing success based on a database of historical prints that rated, reviewed or otherwise measured success of the print based on pertinent parameters.

In some implementations of the current subject matter, analysis of a raw image may include a priori knowledge of past traces that have been successfully processed, for example, by the CNC machine 100, other CNC machines, and/or networks of CNC machines that includes and/or excludes the CNC machine 100. The machine processing instructions generated upon completion of a trace may be based on settings that were previously applied with success to a past trace that is determined to be similar. The proposed plan for machine processing may be visually presented to the user who may then be offered an opportunity to manually adjust and/or manipulate different components of the proposed plan (e.g., toggling thresholding values up and/or down to improve planned output). If the machine-derived settings for a particular category of traced image is being consistently adjusted by an end-user or multiple end-users, this may indicate the machine-derived parameters are suboptimal. Accordingly, the difference between the machine-generated output and the user-adjusted output may be used to derive future sets of default machine parameters, thereby improving overall user experience. Such approaches may also further identify sub-groups of image types and enable their processing to be automatically optimized. The likely inputs used in determining such adjustments may include print success rate based on machine outputs, user opinion (e.g., five-star post-print rating system), print failure rate and/or cancellations, other user feedback, deviations from the machine default processing settings, and/or the like.

Selection of Material Detection Methods

The method for material outline detection for the material 140 placed within the CNC machine 100 can vary based on the diverse surface or imaging properties of that material 140. For example, methods based on image derivative analysis may be less effective for transparent objects (e.g. glass) or objects with edges that closely match that of their surroundings (e.g. black acrylic on a dark bed). Therefore, the method for material detection that the CNC machine 100 chooses to apply to a given case may be a parameter that is user-configurable or machine-selected. One such implementation of this concept, a material barcode scanner (or a scan performed by an onboard camera) can be used to identify the certain properties of the material 140 (e.g. a transparent material less well-suited to edge detection, but of known dimensions based on the barcode) laid in the material bed 150 of the CNC machine 100, or may even individually identify the piece of the material 140 including all historical processing records. In some implementations, when the outline of the material 140 is already known (e.g. from a barcode scan that associates the scanned information with a specific material outline), the material outline can be defined for use with further operations as described herein. The barcode scan is only one example of specifying a material outline without edge detection. Other methods can include, for example, a user entering data identifying the material 140 placed in the CNC machine 100, a user manually defining (or selecting from a list) a specific material outline (e.g., providing dimensions or coordinates that define the material outline), and/or the like.

Once the material outline has been captured or otherwise determined, the outline of the material 140 can be displayed to the user. The material outline can be used as an input to automated layout algorithms that attempt to place all parts of a desired pattern or cuts/engravings within the material 140 confines. The material 140 outline can be used as a set of constraints in a virtual simulation that would allow the user to drag around parts that would collide with the edges of the material 140, so the user could experiment with positioning of parts without dragging them off the material 140. Some implementations can include counting discrete chunks of present material to provide feedback (e.g. visual alerts, audio alerts, electronic messages) to the user; for example, when a design requires two different materials, but the CNC machine 100 only detects the presence of a single material type. Also, by identifying the area of the materials, the CNC machine 100 may be inform the user if the areas, as positioned, are either too small to be safely cut, or need to be cleaned out.

Project Preview

Figure 10:
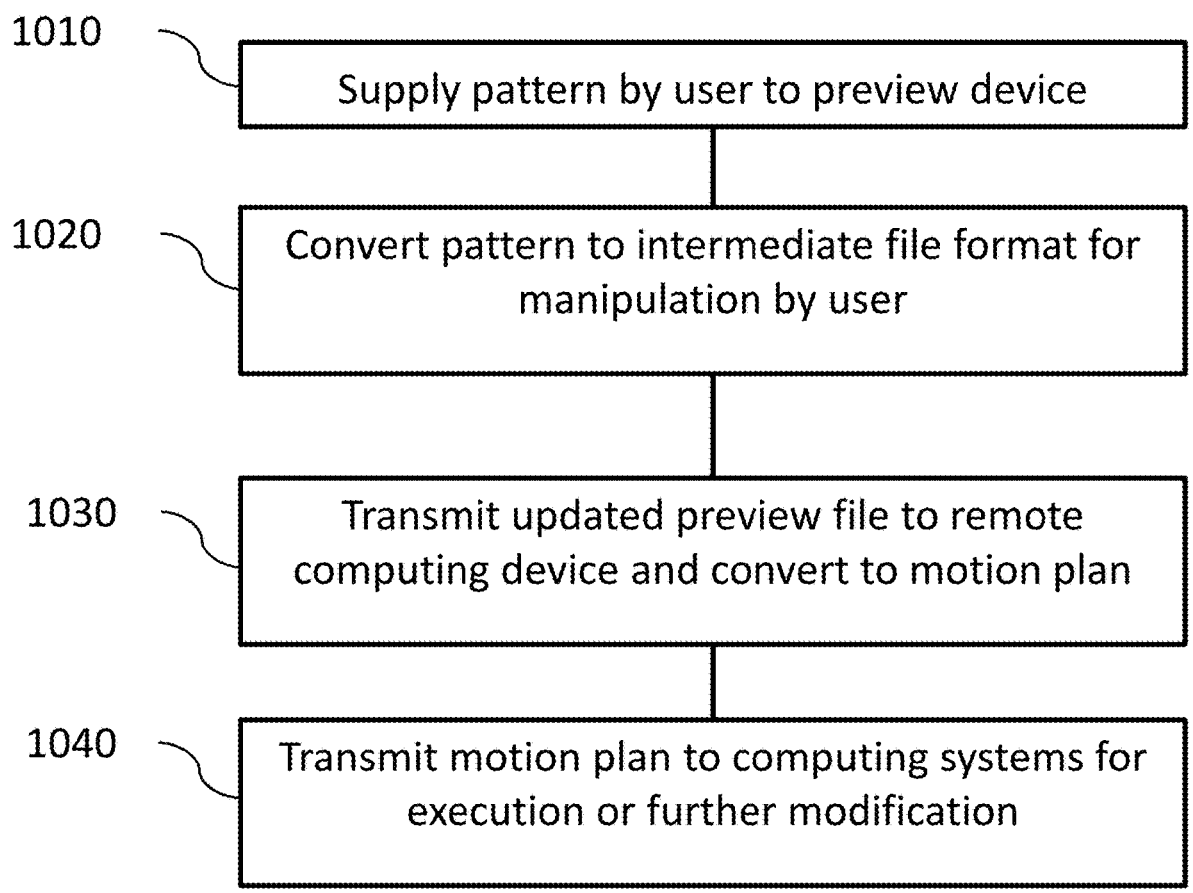
FIG. 10 is a process flow chart illustrating generating a project preview on a distributed computing system, consistent with some implementations of the current subject matter.

FIG. 10 is a process flow chart illustrating generating a project preview on a distributed computing system, consistent with some implementations of the current subject matter. In one implementation, a user can generate or supply patterns to be converted into a motion plan that the CNC machine 100 can execute. A pattern can be any visual representation of what it is that the CNC machine 100 is to cut, print, form, etc. The pattern can be a drawing, image, outline of a part, etc. The process can include: starting with a pattern, manipulating the pattern into a modified pattern, converting the modified pattern into a motion plan, and executing the motion plan by the CNC machine 100.

At 1010, the pattern can be supplied, for example by the user, to a preview device in the form of a pre-existing image file. The image file can be in any file format, for example, a JPEG, PDF, bitmap, Scalable Vector Graphics (SVG), etc. The preview device can be, for example, a mobile device, laptop computer, tablet computer, desktop computer, CNC machine 100, etc. The image file can also be the same as a source file, and vice versa. Here, we distinguish between an image file and a source file by generally assuming that the image file is not in a finalized state to be used as a source file. Consistent with implementations of the current subject matter, an image file can be created from an image captured by one or more cameras that view the working area of the laser CNC machine. A machine file can subsequently be generated form the image file, optionally based on user input or manipulation of the image file received via a user interface.

Also, image files corresponding to the material 140 on which the pattern is to be cut can be specified by, for example, the user, imaged by the cameras in the CNC machine 100, identified from the watermark, barcode, etc. If images of the real material 140 are not being acquired by the cameras, then images of the material 140 can be accessed from a library or other database that stores images of materials. If the material 140 can be identified, for example by a barcode or by image recognition, then specific post-fabrication material 140 properties can be accessed. For example, a light colored wood may turn dark when a certain amount of laser power is applied; this can be determined for a more accurate preview of what the material 140 will look like post-fabrication. In one implementation, the material 140 is uniquely identified e.g. with a barcode and photographed at its point of distribution. The material 140 is then obscured with a protective layer. When the material 140 is inserted into the CNC machine 100, instead of showing the protective layer, the machine determines the material 140's unique identifier and retrieves the photograph, showing what the material 140 looks like underneath the protective layer. If called upon to preview a project with that material, it will use the stored image of the material's appearance in the preview.

At 1020, the pattern can, if needed, be converted to an intermediate format, for example, an SVG format, and sent to a web browser or other software program capable of manipulating SVG files. The received SVG file (or other appropriate file type) can be rotated, expanded, translated, or the like, by the native software in the receiving computer or by a remote server, and then either those transformations or the resulting transformed file may be returned to the server.

The image files for the material 140 can be combined with the pattern to provide a preview of what the cut will look like on the material 140. Additionally, the type of cut can be selected by the user and the preview updated accordingly. For example, the user can specify a cut depth for each point on the pattern. The cut depth can range from, for example, zero (or no effect) to 100 indicating a cut through the material 140. Again, a library or database of recorded cuts for the given material 140 can be accessed in order to show what the cut will look like, for example, with the specified depth, on the specified material 140. Additional features of the preview can include showing effects of laser power (scorching), varying the spot size of the laser, etc. For applications involving 3D printing, the preview can include, for example, displaying the pattern as it is built up, showing the necessary buttressing to support the pattern, etc.

Notes or other instructions can be generated during the preview and appended as metadata to the source files used to generate the motion plan, for example, comments, instructions, etc. Some metadata can be converted into a portion of the motion plan while other metadata can be stored for later reference and associated with the motion plan.

At 1030, the manipulated or updated preview can be used to modify or update the source files, for example the SVG files, used to generate the motion plan. Data corresponding to the preview can be transmitted to a remote computing device, for example, a server, mainframe, cloud network, etc. Once transmitted, the manipulated preview can be converted to back to its original file type, another file type, or to a motion plan.

At 1040, the motion plan can be transmitted to one or more computing systems, CNC machines, etc. The motion plan can then be executed or modified by the local machine as needed.

Additional images of the working area can be captured in conjunction with causing a change in operation of a component of the computer numerically controlled machine. The change in operation can include changing a light output of lights between taking the image and the additional images. The position of the component can be changed between taking the image and additional images, and vibrating the camera while taking the image and/or the additional images. The improved image can include sharpening, correction of lighting artifacts, averaging, edge detection, and noise elimination relative to the image. The images can be generated with differing lighting conditions created by light sources inside the interior space. The light sources can include light resulting from operation of laser.

Material Preview

Figure 11:
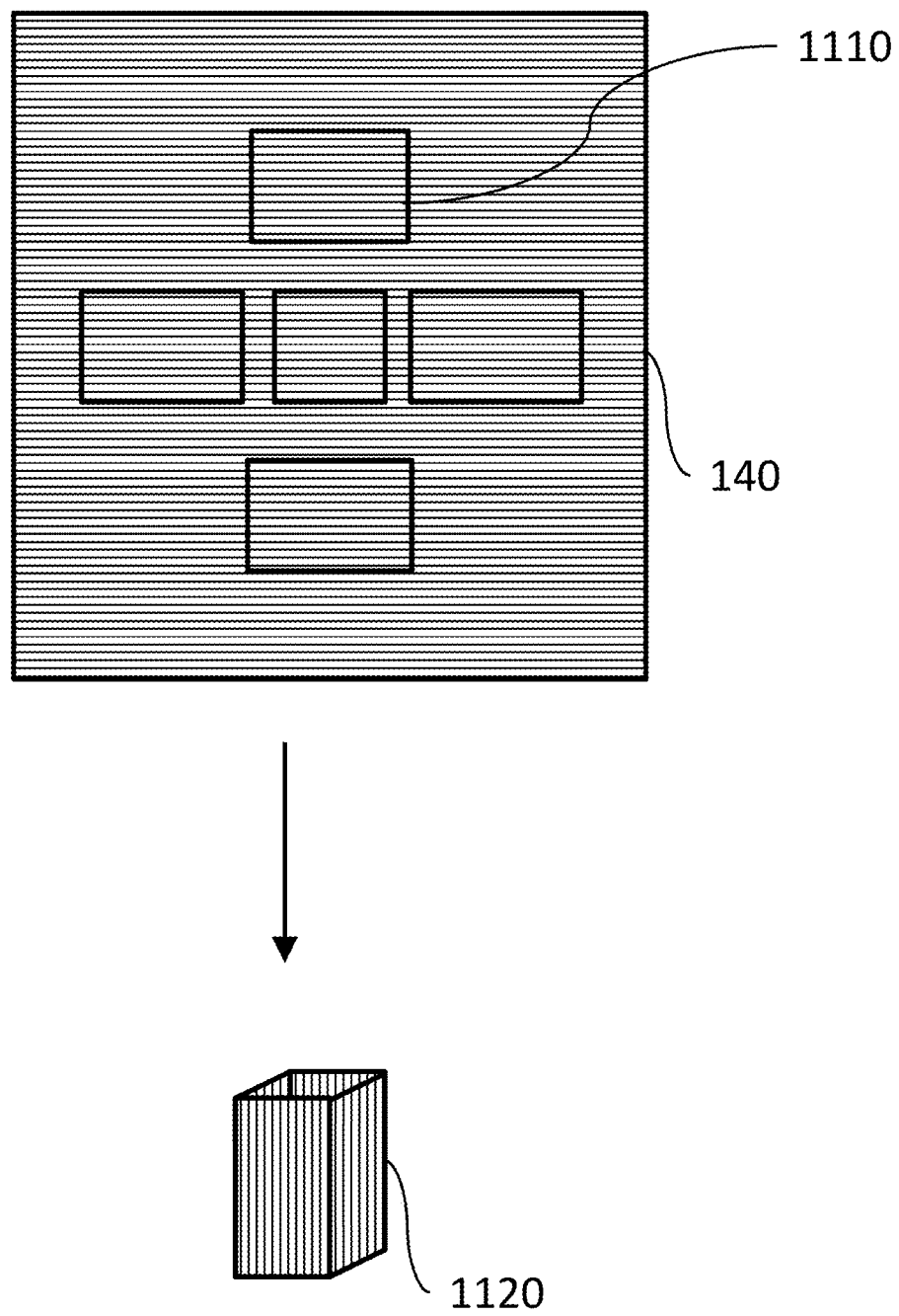
FIG. 11 is a diagram illustrating a collection of 2-D patterns previewed as a three dimensional object, consistent with some implementations of the current subject matter.

FIG. 11 is a diagram illustrating a collection of 2-D patterns 1110 previewed as a three dimensional object 1120, consistent with some implementations of the current subject matter. The cameras can capture the appearance of the material 140 in the CNC machine 100 before machining. For example, the system can display to the user what the final product will look like, rendered as a three dimensional object 1120. The images of the material 140 can serve as a texture map, which can then also be rendered onto the three dimensional object 1120. In addition, the three dimensional object 1120 can be rendered and rotated using various projections (perspective, orthographic, etc.). This means the user can accurately see what the final product will look like with the material 140 currently in the CNC machine 100. Further, if there are defects in the material 140, the user can see where they will appear on the three dimensional object 1120. If, in software, the user repositions the location of the cuts on the material 140, the result of the material 140 preview can change to reflect the repositioned cut locations. Among other possible benefits, this feature can allow the user to optimize the patterns to have poorer quality areas of the material 140 hidden from view, such as on an interior surface of the assembled product, or outside of the patterns entirely. It also allows the user to preview their creation using different materials, to help in material selection.

The user can also indicate the position of the cuts across multiple materials 140 present on the material bed 150. For example, the user can place a piece of maple and a piece of walnut plywood on the support, then use the image of the material 140 on a screen to arrange the location of the cuts such that some pieces are made out of maple and some are made out of plywood. In another manner, a user can select some shapes in the pattern to be cut from each type of material 140 depending on the appearance or physical properties desired.

Different power levels for the output of the head 160 and head speeds can result in different appearances of the material 140 during processing. For example, the head 160 moving at different speeds can cause a burn pattern left behind by a laser to vary, the roughness of a cut made by a milling bit to vary, etc. The user can preview what the material 140 will look like after processing by using images captured from, for example, a previous calibration step. The appearance of a type of wood marked with 20% of maximum power during calibration, for example, can be used to predict what an engraving at 20% power will look like. The predicted appearance can be shown on a graphical display to the user to aid in project design or in the selection of settings to use.

The cameras can also capture the appearance of the material 140 after being cut, engraved, turned, printed upon, etc. These captured images, accessed either from an image library or acquired from test cuts on the actual material 140, can provide an accurate image of the response of the material 140 to machining using particular output parameters. For example, test cuts at a given power, head 160 speed, bit rotation, or the like, can be performed in a scrap area of the material 140 to provide examples of how the material 140 will appear if cut with those same settings. Similarly, the image of the material 140 after being cut may be used to assess the material's new position following some interaction with the user. For example, a large design whose size is roughly twice that of the material bed 150 can be completed in the form of two sequential cuts with a pause between them in which a user, or some material translating mechanism associated with the CNC machine 100, repositions the material to expose further un-cut space. The camera can then determine from what point the cut was left off and provide an image that includes the position at which the cut should resume.

If the material 140 is recognized from a library, image analysis, or a previous usage, pre-calculated or stored settings can be used to provide a desired result. The identification of the material 140 from a library can be accomplished in several ways.

First, barcodes or other markings can be used to identify the type of material 140. These can be visible or can be invisible to the naked eye and revealed only with an infrared camera and illumination, or under ultraviolet light provided by appropriate lights e.g. UV LEDs. They can also be printed in standard visible ink. Text can be printed on the material and recognized with optical character recognition software. The camera may also detect incidental markings, such as the brand of material 140 on a protective sheet.

Second, the cameras can use image recognition to identify the material 140. For example, the grain structures of maple, cherry, and walnut are all distinctive. Distinctive colors and patterns in the material 140 can be imaged and compared to known material 140 examples stored in a local memory of the CNC machine 100 or stored on a remote computer.

Using Marks and Drawings to Indicate Cuts

Scanning by the cameras can also be used for copying the pattern of an existing 2D object. In one example, the user can make a marking on a piece of material 140 using a black pen. They can then place the material 140 in the unit. The camera can scan the image and isolate the region with the black pen, using the image to create a source file. The system can then generate a machine file and a motion plan, instructing the machine to move into position, move the head across the indicated region along a calculated path, activate the engraving function, deactivate the function, and finish. The result would be that the material 140 is engraved in the same location and with the same marking that was applied with ink. Different colors of ink can be used to indicate different operations, for example a red line might be used to indicate cutting while a brown line indicated a light engraving. Functions can be specified in software between the scanning step and the creation of the machine file, for example the user might be asked if the black marks should be cut or scanned. Other indicators than ink might be used, for example the user can cut a paper snowflake and use the machine vision system to scan its perimeter and generate a source file from the image of the perimeter. In all these examples, the source file can be saved and modified, so the scanned image could be moved, resized, repeated, or preserved for later.

In another implementation, the cameras can detect a pattern on the material 140 that corresponds to a design stored in memory, and then the CNC machine 100 can machine the stored design onto the material 140. Note that this is different from alignment marks, which can be used when the motion planning software is told where the alignment marks are and what the corresponding design is. In this case, the cameras can image the material 140 and the alignment marks and determine what the design is from the images. In another example, the cameras can identify a piece of scrap left over from a previous operation by imaging the cut marks present as a result of the previous operation, or created intentionally on the scrap as alignment marks anticipating that the scrap could be used with further processing.

In one implementation, material 140 can be inserted into the CNC machine 100 that has a certain pattern, for example, a red square circumscribing a filled in black circle. The material (and the pattern) can be imaged by the cameras. A particular operation can be selected based on the image, for example, red lines can be converted into vector cut paths and black areas can be converted into raster engravings. A motion plan can be generated based on the selected operations, for example, cut out the square and engrave the circle. The CNC machine 100 can then execute the motion plan to perform, for example, the cutting and the engraving.

Different color marks can indicate different cutting operations—for example, a red line might indicate cut through, while a black filled in area might indicate to etch. A sheet of paper, or other suitable overlay, containing a pattern or picture can be fastened to a piece of material 140, then that pattern or picture can be engraved directly on the material 140, through the overlay. This form of design can be applied directly to the target material 140 with the overlay presumably destroyed by the machining operation. Alternately, the material can be removed before the operation commences. In either case, the pattern can be saved for later, modified and/or repeated. The type of output from the CNC machine 100 can vary with the color, line thickness, line type, etc. As one example, a blue line could indicate to etch at 40% power, and a green line could indicate to etch at 60% power.

A user can also put a drawing in the CNC machine 100 separately, allow the camera(s) to scan the drawing, and then insert a separate piece of material 140 to be cut or engraved. The first pass of a scanning camera can scan the image while the second pass, with the head 160, can cut the material 140.

The system can use a screen, projector, or other visual feedback unit to generate virtual overlays of programmed cut lines on images or video of the actual material 140. Also, images gathered previously, for example, during a calibration pass where test cuts are made, can allow the preview of the cuts to appear realistically. For example, the actual material 140 texture and the typical "V" shape of the cut or singing at the cut edges can be displayed when previewing the product. The user can also opt to arrange pieces between multiple materials that may be present or rearrange them to take advantage of material properties, for example aligning pieces with the grain of the wood.

Similarly, the user can insert both the drawing and the material 140 to be cut at the same time but in different locations on the machine bed, and indicate that one is the source and the other is the destination. In this example, the user 'copies' the image from one piece to the next. The user can optionally resize or otherwise modify the drawing in software before machining. For example, the user can specify that the destination is to be magnified, rotated, and/or translated, relative to the source. In the example of a cut into transparent material, such as glass or clear acrylic, the drawing may also be placed visibly on the underside of the material, thus minimizing these interactions.

Generating Motion Plans on Distributed Systems

Figure 12:
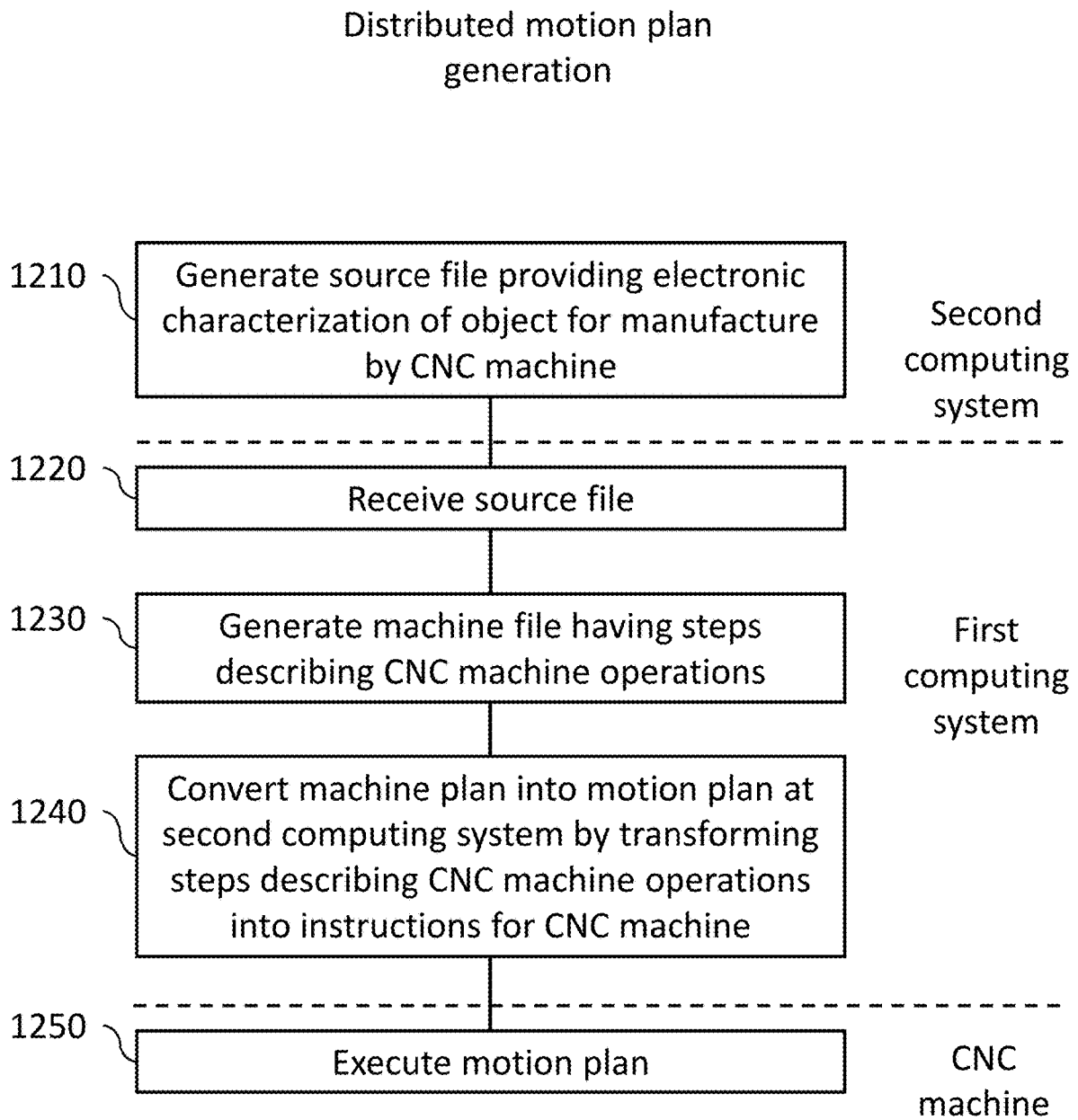
FIG. 12 is a process flow chart illustrating generating a motion plan for a CNC machine on distributed computing systems, consistent with some implementations of the current subject matter.

FIG. 12 is a process flow chart illustrating generating a motion plan for a CNC machine 100 on distributed computing systems, consistent with some implementations of the current subject matter. At 1210, source files can be generated by providing an electronic characterization of an object for manufacture by the CNC machine 100. The source files can be photos, screen captures, electronic tracings, CAD drawings, etc. The source files can be sent to the first computing system by, for example, uploading to a server, etc.

At 1220, source files can be received by the first computing system.

At 1230, a machine file can be generated at the first computing system. The machine file, as described above, can include steps describing operations of the CNC machine 100.

At 1240, the machine file can be converted into a motion plan by the first computing system. Also as described above, the motion plan can be a set of instructions for the CNC machine 100.

At 1250, the motion plan can be transmitted to the CNC machine 100 over a network.

Variable Cut Depth

Because the distance between the head 160 and the material 140 is generally fixed, there are a limited number of ways in which cuts of different depth can be made. Three ways of varying the depth of a cut can be, for example, (i) varying the laser power, (ii) varying the speed with which the laser moves, (iii) varying the focal length of the laser, and (iv) a combination of these.

By varying the laser power, for a given dwell time at a particular location, the depth of the cut can be varied. For example, to a simple approximation, if the laser power is doubled, then in a given time period, twice as much material 140 can be expected to be ablated during the cut. There can be factors which complicate this kind of simple approximation, for example, debris, material 140, etc. One complicating factor is that the power density drops off with distance beyond the focal point, as the deeper material 140 is farther from the lens and thus out of focus.

The speed at which the laser moves can also be varied as an approach to vary cut depth. This may be particularly useful for manipulating material to have a desired finished appearance or effect. For example, operating at faster laser speeds while maintaining constant application of power may configured to introduce scores, rather than cuts into the material surface.

The focal length of the laser can also be varied in order to provide a constant, or known, power density at a surface with varying height. The focal length of the laser can be varied by adjusting focusing optics inside the head 160 to provide a cut specified by the motion plan. Also, the cameras can monitor a laser's spot size, either the primary cutting laser or a secondary one, as described above, to maintain a specified focal distance for the most precise cutting. Alternatively, the cameras can monitor the spot size during the cut as a measure of the depth of the cut. For example, if it is known that at the focal length a cut was to have a certain depth then the cameras could monitor the spot size to detect that the spot size is reached the expected size given the focal length. Once the spot size is the expected size, then it is known that the cut is a depth defined, in part, by the focal length.

Because the laser power and focal length are generally independent parameters in laser operation, they can be varied together to widen the operating space (e.g. the range of potential visual and/or physical outcomes created on a material) of the CNC machine 100. In a simple approach without feedback, a first pass may be engraved to a depth of 1 mm by focusing the laser on the surface of the material 140. Then a second pass could be taken removing another 1 mm, this time focusing the lens 1 mm lower at the new top surface of the material 140. In an iterative approach with feedback, there can be multiple passes by the head 160 and after each pass the depth of the cut can be measured by the cameras. The CNC machine 100 can then use the measured change in the material to calculate what combination of power variation and focal length settings are used for the next pass. The calculation can be optimized for the type of material 140, cut time, laser power limits, etc. In one implementation, the average power output of the laser can be set to be below a predefined value. The duty cycle of the laser can be varied to provide alternating periods of the laser being on or off. In one implementation, the duty cycle of the laser can be varied in order to achieve the desired average power output.

Cut Verification

The optical system can image the cut and compare the images with those expected from a cut made on a material 140 with known material 140 properties. The comparison can then be used to determine laser power (or other cutting parameter). The comparison can be based on image features (lightness/darkness of engraving), a through cut that should have been an engraving, etc. Alignment can be confirmed by cutting a pattern that should have a particular shape, imaging the cut, and comparing it to an expected image. The motion plan can be updated to correct for any discrepancies and an alert can be sent to a user or other connected computing system that maintenance of the CNC machine 100 is required. Also, calibration cuts can be used to align one or more elements of the optical system. For example, making a cut pattern of a predefined size and adjusting one or more optical elements to confirm that the field-of-vision of the optical element conforms to the cut pattern.

A cut pattern can be designated to go onto imaged portions of the material 140 based on imaged features of the material 140. The designation can be made by user-input or according to pre-defined instructions. For example, the cameras can determine separate materials, colors, textures, etc. present on one or more materials in the CNC machine 100. The motion plan can associate the cut pattern with a particular material 140 or portion of the material 140 based on the imaged features. Once associated, the cut pattern can be executed on the identified portion of the material 140. This can allow, for example, a user to specify a particular cut to go on only certain color portions of a material 140, etc.

Project Preview (II)

A more general application of a material preview can include previewing the appearance of a finished project. The finished project can include the material, and can also include cuts, etches, engraves, etc., that the user wants to be performed by the CNC machine.

In some implementations, a machine file can be created from an image. The machine file can include motion and cutting instructions for a laser CNC machine to cause the laser CNC machine to create one or more cuts on a material located within a working area of the laser CNC machine. The image can be generated by a camera in the CNC machine, imported from a computing system, generated by an image manipulation program based on user input, or the like.

In some implementations, distortions in the image, for example those introduced by optical elements, can be removed by any of the methods described herein. For example, different colors may project onto different chip pixels due to lens refractions, and consequently must be compensated for by aligning the color channels, or using a single channel for dedicated vision tasks (e.g. QR-code recognition). Also, other implementations can remove distortions or generally improve image quality by, for example, adjusting a white balance to compensate for the overall light level. The light level can result from, for example, combination of ambient light (e.g. light from outside the CNC machine), internal lighting, or a combination thereof. These lighting effects can also be corrected, for example, the effect of exterior lighting can be removed, as described herein. Digital manipulation of the images can be performed, for example, brightening, sharpening, converting to color images to greyscale, or the like. Lighting within the CNC machine can be adjusted to achieve a desired balance, brightness, shadowing, or the like. Thresholding can also be performed to capture only areas that are sufficiently bright or dark to generate a useful image. High-pass filters may be used to remove gradients of light or color. Low-pass filters may be used to remove noise, for example from the image sensor.

The previewing can also include generating a preview that includes a representation of at least part of the material. The representation can also include an overlay of cuts superimposed on the material to indicate an appearance of the material after processing of the material by the laser CNC machine using the machine file. The representation can be, for example, a graphical computer file, a graphical output displayed on a computing device, or the like.

There can be several implementations of methods or systems that describe how the image is generated and what operations can be performed based on the image. In a first implementation, the image can be of an item and/or the material in the CNC machine, where the item can serve as the basis of the CNC machine operations. In a second implementation, the image can be of a material in the CNC machine, where the image acts as a backdrop and a preview of user-specified CNC machine operations can be displayed.

In one example of the second implementation, the machine file may be simulated graphically on a display interface. The simulated machine file can be represented by graphical elements that can represent the path of a cut, a type of cut, a depth of cut, an intensity of a laser, a speed of a tool moving across/over the material, or the like. As one example, a partially-opaque dot can be placed on a display interface for every millisecond that the laser is active. As a result, the user can see areas of slow motion as bright lines (with many overlapping translucent dots) and fast motion as dim lines (with fewer dots, thereby letting more of the underlying material show through). The machine file may be run in real-time, sped up, or processed as a batch at any time after previewing the result of executing the machine file.

General Discussion of Machine Instruction Based on Captured Images

Some implementations described herein relate to combining source images that represent marks, cuts, or other operations of a CNC machine with data on the material in the CNC machine. The CNC machine can then operate on the material to provide a desired reproduction or other effect on the material, based on the source image.

First, in some example implementations, a camera, for example one or more cameras integrated into the CNC machine, can act as the image capture device for scanning both objects containing the source image and also the material. The cameras, as discussed elsewhere, can be wide-angle cameras (e.g. the lid camera), narrow field-of-view cameras (e.g. the head camera) or any other combination of cameras. These cameras, among other things, can provide not only data on the source image, but additional features of the source and/or target material. For example, the cameras can be used to determine surface features, such as depth, color, vertical surface angles, or the like. In this way, the CNC machine can function as a smart, special-purpose scanner that is optimized for creating designs based on laser cutting/engraving.

Second, in other example implementations, the source image can originate from devices other than the cameras in the CNC machine. For example, the source image can be a user-supplied photograph, CAD file, bitmap, jpeg file, SVG file, or the like. The source image, in this example from a source besides cameras in the CNC machine, can be overlaid or previewed against images of the material in the CNC machine. By referencing the points in the source image to the points in on the material, the desired features of the source image can be cut/engraved onto the material according to user-supplied instructions or pre-established CNC machine settings.

Third, in yet other implementations, a combination of the two methods above can be performed. Here, the source image and the image data on the material in the CNC machine can be combined, and then can optionally be seen with preview software. In the preview, the source image can be modified according to user-supplied instructions and features can be specified for particular CNC machine operations (e.g. cutting/engraving). In this way, the cut-file (containing the instructions for CNC machine operations) can be superimposed on an image of the material in the CNC machine, on an image of a source object, or both. The CNC machine can then operate on the material/source object as instructed by the cut-file.

The unique information that the machine possesses of not only the source image's appearance but also its position in space (the location in the bed, the thickness at its various points, etc) allows the ability to position the cutfile precisely on the source image so as to cut out or engrave directly over the drawing shown. This extends to implementations involving full 3D-dewarping of the input image into, for example, an orthographic projection.

Features of these implementations are expanded on in more detail throughout the application, and in particular in the following sections.

Optimizing Image Capture for Downstream Processing in CNC Machine

FIG. 13 is a diagram illustrating the removal of distortions from an image, consistent with some implementations of the current subject matter. Capturing and formatting images to facilitate generation of machine files for downstream processing by the CNC machine 100 may be accomplished through a variety of means. In one approach, additional imagery can be requested for the purpose of gathering sufficient or optimal information for cut-file creation after a first image or set of images is captured. In another approach, capturing a single image channel can improve image quality at the corners of an image, particularly when using wide-angle cameras whose colors are otherwise smeared due to different light wavelength refractions. Also, different imaging quality compression levels can be used to provide either lower quality images which transfer at a faster rate and/or higher quality images which transfer at a slower rate.

In some implementations of the current subject matter, the cloud-based nature of the product has been robust in supporting lossless compression, thereby avoiding any reductions in data quality. However, one or more compression techniques may be employed for some computational tasks that require excessive resources for example, in processing power and/or time. The decision to employ compression may be determined by the client and/or the server, using techniques such as, for example, querying the user in the interface, making an automatic determination based on current traffic patterns, deciding based on the amount of payment provided by the user, and/or the like.

Methods for collection of additional information can include, for example, moving the camera, increasing the requested resolution from the camera, changing camera settings (i.e. as reducing gain to capture additional detail on an area of interest such as a bright area that has oversaturated the sensor), or changing internal machine settings to make the environment conducive to capturing the desired imagery (i.e. turning on an internal machine-controlled source of illumination). The requirement for additional imaging information may be determined by a user by requesting better data, inferred for example by a user requesting an operation that would require better data for optimum results, or by a range of automated means including analysis of data from cameras or other sensors, or the like.

A range of image corrections and manipulations may be applied for the purpose of optimizing imagery for downstream processing applications. Such corrections can be made starting with raw image data from the camera (e.g. 'Camera Raw' files) or standard picture files appropriate for human viewing (e.g. JPG files). In some implementations, a known or reference image can be used as the basis for correcting image elements; color correction is one application that exemplifies this approach. For example, if an imaged object is of a known color, techniques such as white-balancing based on this reference image can be applied. The color of a reference image can be known via a variety of methods, for example, including user-derived inputs, barcodes or identifiable features that indicate the nature of the material, the reference object forming part of the CNC machine 100 (e.g. the housing having a known color), or the like. Other examples of image correction can include selecting a threshold level for black and white image conversion, high-pass filtering or adaptive thresholding that can locally adapt to conditions in the CNC machine 100 in order to capture objects (for example dark or shadowed objects), high-dynamic-range (HDR) imaging such as merging multiple images with different camera settings to improve the capture of information, and application of smoothing techniques for enhanced visual results. The need for performing image correction or manipulation can be, for example, requested by a user, inferred from a user action, a range of automated means including analysis of data from cameras or other sensors.

In capturing and preparing images for downstream processing by the CNC machine 100, users can benefit from the ability of the software, for example that generating the machine file or the motion plan, to disregard or eliminate detection of particular color channels. This feature can be broadly useful for users wishing to mark materials or images for non-imaging or non-printing purposes. For example, users may wish to make annotations in a particular color pen for their own purposes that may be independent of the designs, images or other elements intended for sensor capture; this feature may have particular utility in aiding creation and construction of complex articles. For example, a user may pre-print a template in one color, then use that template to create artwork in another color. Upon imaging, the first color might be discarded and only the second color retained. Elimination of a color channel may be performed automatically (e.g. hardcoded in the software), in accordance with a set of conditional rules (that can be configured by a user or otherwise suppled to the CNC machine 100 or other connected computer), or upon explicit instruction from the user received at the CNC machine 100 or provided as additional instructions to the CNC machine 100.

In some implementations, aspects of the design can be interpreted to extract information about the design, or parts of the design. For example, one or more real dimensions of the design can be measured, in part, by imaging the design with a camera in the CNC machine 100. One specific example can be a camera at a 45 degree angle to the surface where a design including an "A" is printed. Because of the angle, the "A" will appear contracted in one dimension. Knowing the geometry of the camera relative to the location of the design can allow the measurement of the real dimensions of design, as opposed to the apparent dimensions in the image. To implement this level of precision, the vision system may be calibrated together with the laser system. A full 3D model calibration of both vision and laser systems enables mapping between material surface points and pixels in all cameras, adjusting for even small variations that may impact precision. For example, the area of the bed that is captured by the lid camera may shift by a few pixels, depending upon the exact position of lid closure. Such shifts may be compensated for by using methods varying in degrees of sophistication including, for example, plain image shifts, elaborate 3D models of the lid joint referencing features inside or out of the CNC machine bed 150 to model parameters, and/or the like.

The precision associated with surface mapping and the performance of trace functionalities either from or onto slanted, curved, or other more complex surfaces and objects, may depend on the calibrated environment of the CNC machine 100. By establishing and maintaining spatial fixes on internal components with high precision. For example, spatial fixes can be established and/or maintained by calibrating the head 160 of the CNC machine 100 and its associated vision components with an appropriate degree of confidence for the level of trace fidelity that is required. It should be appreciated that spatial fixes can be established and/or maintained through a single calibration upon initialization for base-level precision and/or repeated calibrations to fine-tune spatial fixes after every print and/or each segment of a print (e.g., for over-sized and/or particularly detailed work).

Figure 19:
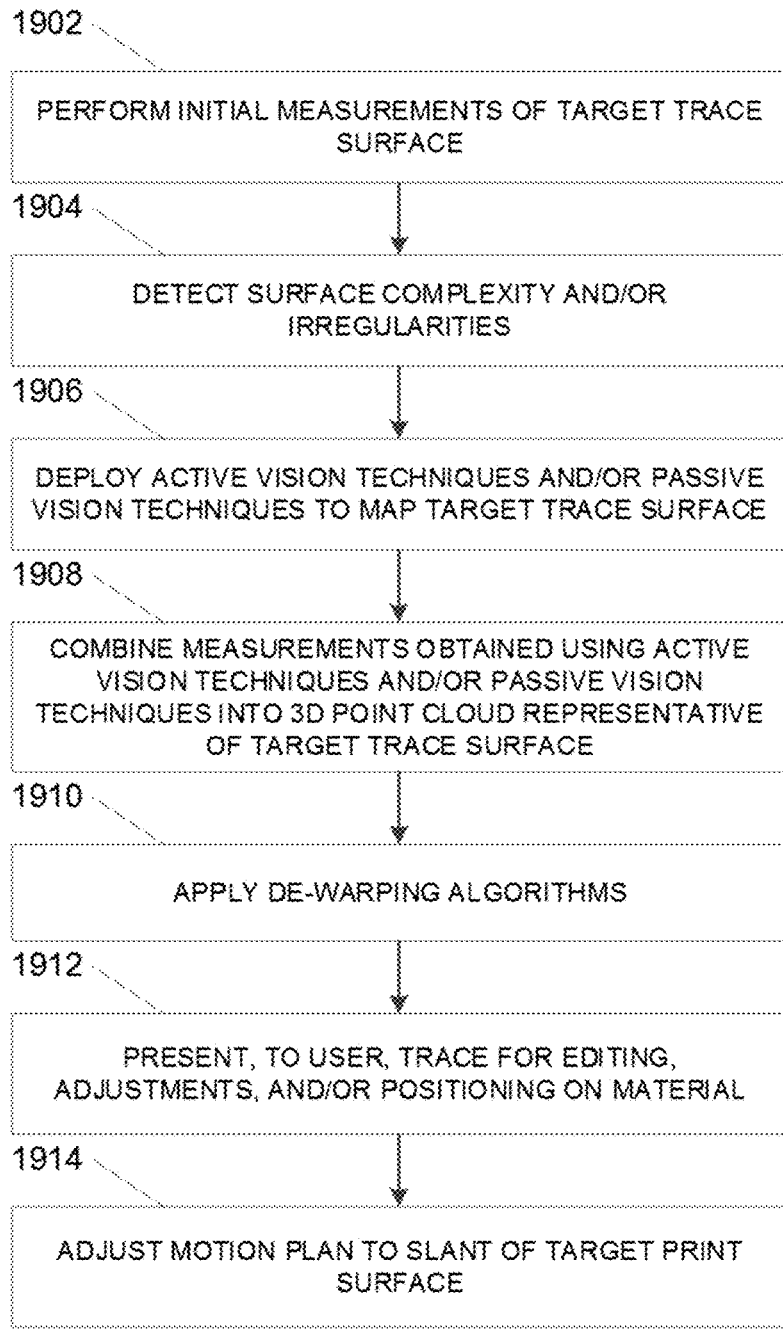
FIG. 19 is a flowchart illustrating a process for tracing from complex surfaces and making fine-tuning adjustments, consistent with implementations of the current subject matter.

FIG. 19 is a flowchart illustrating a process for tracing from complex surfaces and making fine-tuning adjustments, consistent with implementations of the current subject matter. It should be appreciated that the process shown in FIG. 19 may apply to both image capture as well as image projection onto such surfaces for the purposes of printing. At 1902, depending on the complexity of the surface, one or more initial distance measurements can be used to define the surface involved in the image trace. For example, a dot of visible light projected at a single point on the desired trace surface and the properties of that dot as observed through the system's vision components can be used to establish the distance between the trace surface and the camera. Moreover, measurements associated with this projected dot, by virtual of being made within a calibrated system, can further allow confident mapping of this point within the 3D space of the system itself.

At 1904, surface complexity and/or irregularities can be detected. In some implementations of the current subject matter, as additional point measurement are made across the surface, a 3D point cloud (or alternate methods, such as a 2.5D point cloud) may be constructed. The number of measurements necessary to map a surface with adequate precision often increases commensurately with the complexity of the surface, however such settings may be programmed by the user manually or via selection of a pre-programmed setting designed and optimized to produce good outcomes under particular conditions. Some examples of techniques for mapping the surface may include a 'simple pass mode' for flat surfaces, a 'slant mode' for tilted surfaces where at least three distance measures are taken to estimate the tilt of the plane, a 'deep-scan' mode for highly convoluted surfaces, a 'warped material mode' for working with imperfect materials where the user may input a subjective assessment of the warp (e.g., from minor dents or bends, through to major curves or divots) and the system applies an appropriate level of vision-based scrutiny of the surface, and/or the like. The system can also autonomously determine the level of precision required in obtaining the point cloud measurements for a given situation. For instance, a lower precision scan can be performed initially to identify areas of complexity and/or differences, which can then be reanalyzed with higher precision scans. The sophistication of how these distance measurements are obtained for the purpose of defining the shape of the target trace surface or image can also vary.

Figure 20:
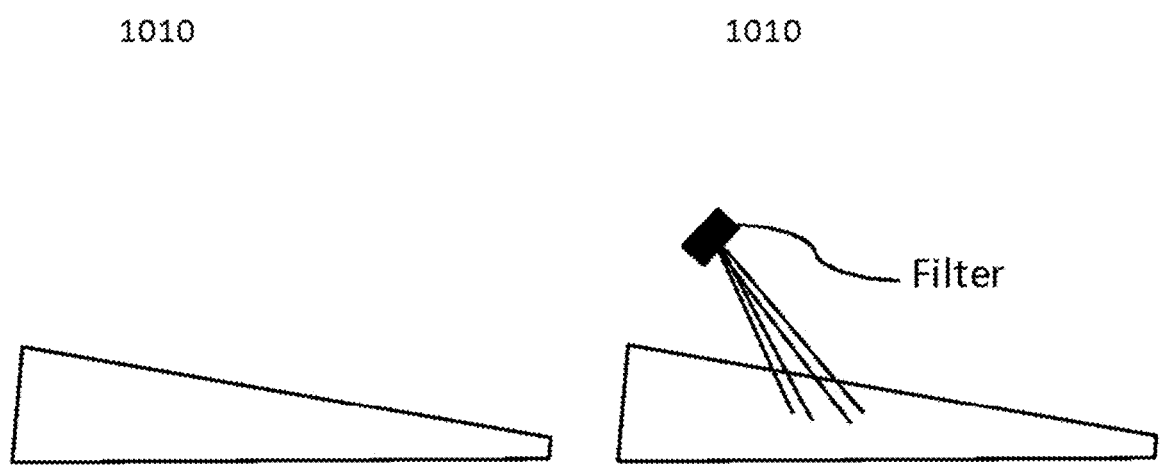
FIG. 20 is a diagram illustrating an active vision technique for tracing 3D surfaces and/or images, consistent with implementations of the current subject matter.

At 1906, active and/or passive vision techniques for mapping the surface of the can be deployed, for example, based on the complexity and/or irregularities exhibited by the surface. In some implementations of the current subject matter, active vision techniques may be used for applications involving surfaces with increased complexity. For example, with active vision techniques, additional distance measurements can be sampled simultaneously from a single light source via the use of a filter that splits a single beam of visible light into multiple beams that project a pattern with known geometry. The split light pattern may be used to illuminate the surface that is being traced. This is shown in FIG. 20, which is a diagram illustrating an active vision technique for tracing 3D surfaces and/or images, consistent with implementations of the current subject matter.

Adjunctive improvements to active vision techniques are also possible. One example of an improvement is to vary the size of the dots produced by the visible light source and projected onto the surface. It should be appreciated that smaller sized dots can enable and/or optimize the measurement of smaller and/or more intricate surface topographies. Another example of an improvement to active vision techniques includes assessing the shape of the dots, thereby obtaining additional information regarding the surface being traced. For example, if a symmetrical cone of visible light is known to shine a circular shaped dot from its mounted position, one can assess the shape of dot observed on the surface, which may range from being circular when the surface is flat to being oval when the surface is slanted. The degree of tilt of the surface can be determined based on the distortion to the original circular shape of the dot.

In some implementations of the current subject matter, the refractive index of the material that form the surface being traced can also be used to improve the output of active vision-based measurements. Alternatively and/or additionally, ultra-precision active illumination may be achieved through fitting the cameras to have more degrees of freedom of movement (e.g., the ability to be tilted and rotated at various angles with very controlled movements, etc.), may further enhance precision of the measurements obtained using active vision techniques.

Figure 21:
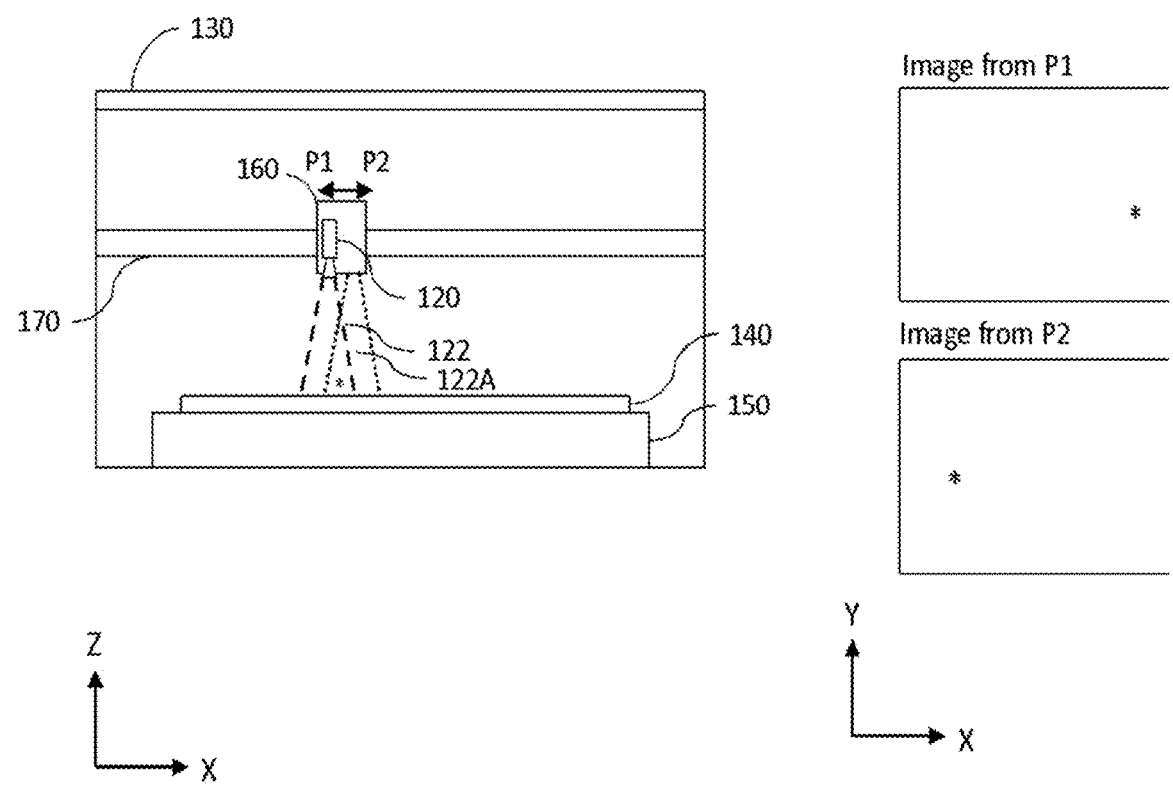
FIG. 21 is a diagram illustrating a passive vision technique for tracing 3D surfaces and/or images, consistent with implementations of the current subject matter.

Instead of and/or in addition to the aforementioned active vision techniques, the surface of the material can also be mapped using passive vision techniques. Stereovision is one example of a passive vision technique that can be used to define the 3D shape of the target trace surface and may be especially suitable for textured surfaces. Using a stereovision approach, two pictures from two adjacent locations (e.g. 1-3 millimeters apart) may be taken by at least one optical sensor (e.g., the lid camera 110 and/or the head camera 120 within the CNC machine 110). To further illustrate, FIG. 21 is a diagram illustrating a passive vision technique for tracing 3D surfaces and/or images, consistent with implementations of the current subject matter. As shown in FIG. 21, the head camera 120, which can be coupled with the head 160 of the CNC machine 110, can be moved from a first position P1 to a second position P2. The points detected within these two images may then be compared, leveraging information from two known optical vantage points. The calibrated locations of the internal optics are known, as well as the relative spatial difference between the optics that captured each image. As such, by triangulation in space, the location of points of interest can be inferred, enabling population of a 3D point cloud corresponding to the 3D surface and/or image being traced.

It should be appreciated that other approaches to improving the 3D tracing capabilities of the CNC machine 100 may be conferred by providing additional knowledge that aids recognition. For instance, a priori inputs from the user and/or detection of well-characterized objects by the CNC machine 100 may expedite the 3D scanning features of the machine. For example, if the target trace surface is a laptop computer, and the specific make and/or model of the laptop computer are input by the user, a 3D scan of this surface may be possible from as little as a single image.

At 1908, the sum of calculations obtained from applying the active vision techniques and/or passive vision techniques can be used to create a 3D model of the target trace surface. At 1910, one or more de-warping algorithms may be applied. At 1912, the user can be presented with the trace for editing, adjustments, and/or positioning on the material. It should be appreciated that the de-warping algorithm applied at operation 1910 can assist the presentation of the trace to the user. At 1914, the motion plan to be executed by the CNC machine 100 can be adjusted to the slant of the target print surface.

The de-warping algorithms applied at operation 1910 can be based on certain assumptions and/or known constraints relevant to 3D trace. For instance, an image traced from a curved surface may be de-warped under the assumptions that while the traced image may include bends, it is constrained in other respects (e.g., it cannot stretch). As such, a 2D image with proportions matching the original may be reconstructed. Alternatively and/or additionally, should the target surface for processing be curved or complex, the motion plan of the print executed at operation 1914 can be slanted to match the slant of the surface or surfaces involved. In particularly complex cases (e.g., printing across a spherical surface), the print may be conducted in segments where the user may be prompted by the CNC machine 100 to rotate and/or tilt the spherical material to a given degree, and then utilize vision system components to realign and continue printing. In such complex cases, segmentation of the 3D point cloud may be necessary to perform the trace of the 3D surface and/or image, and to with sufficient resolution.

The precision of the trace can be further enhanced through calibration steps at the system-level. For example, there may be imperfections that develop over time, such as wear and tear on manufactured parts, and/or use-based inconsistencies. For instance, the lid of the CNC machine 110 may not close the same way each time, which may offset the internal optics and consequently, compromise the accuracy with which traced images appear on processed materials as directed by users (i.e., 'drag-in-place'- and 'trace-in-place'-type functionalities). One technique to correct for these kinds of inconsistencies, for instance, is to recalibrate the camera involved in the trace (e.g., the lid camera 110) at more frequent intervals, such as after every print and/or during a cool-down period. This may be done by automatically instructing a secondary optical sensor (e.g., the head camera 120) to take a picture at a known location, such as exactly where it last printed and/or traced. Any measured offset detected in the image provided by the secondary camera (i.e., the head camera 120) relative to same area in the image provided by the primary camera (i.e., the lid camera 110) can be used to adjust the primary camera images displayed to the user during performance of tracing functionalities. Other approaches may include constructing a 3D model of the lid joint and monitoring this over time for warping or deformity.

Tracing Over-Sized Images and/or Tracing onto Over-Sized Materials

Some implementations of the current subject matter can involve tracing from images, objects, and/or materials having at least one dimension that exceeds the maximum physical dimensions of what the CNC machine 100 is capable of scanning and/or capturing in a single pass. For example, the dimensions of a line drawing to be traced may be on a long banner whose length is greater than that of the material bed 150 of the CNC machine 100. As such, the CNC machine 100 may employ various techniques to enable the capture of a contiguous trace from an over-sized source image.

In some implementations of the current subject matter, the nature of the material may permit physical segmentation. For example, a banner composed of three large sheets of paper joined by semi-permanent means may be detached from one another and scanned individually by the CNC machine 100. The resulting individual scans can subsequently be digitally amalgamated back into the original oversized image through, for instance, manual curation by the user, automatically by the machine, and/or the like. In the case of manual image curation, users may be offered editing features and/or controls (e.g., tools for moving, rotating, enlarging, shrinking, nudging, copying, cropping, flipping, and/or the like) that permit the user to arrange the individual scans in any manner into a single, seamless trace. Here, the amalgamated trace may be saved or otherwise stored locally and/or remotely as an intermediate or final product of the traced function.

Alternatively and/or additionally, automated amalgamation of multiple scans can be performed via, for example, image-matching algorithms and/or the like. The image-matching algorithms may examine each scan in whole and/or in part (e.g., the edges of each individual scan) to determine the most parsimonious way to join the individual scans into a continuous whole. Text recognition algorithms may be used to identify where lettering and/or words may become intersected as an unintended byproduct of segmenting the image. Object recognition algorithms may be useful in matching trajectories of line art in order to identify areas of continuity that make for logical, seamless joins between individual scans. In some implementations of the current subject matter, reference features of the material itself (e.g. wood grain, previous cuts that are either part of the assembly-process or made using the laser, and/or the like) may be used to aid automated image amalgamation. It should be appreciated that users may benefit from having additional fine-tuning capabilities even after automated methods have been used to join image segments. For example, manual fine-tuning of automatically amalgamated scan can be suitable for highly detailed image segments and/or insertion of additional design or stylistic features (e.g., decorative borders and/or spacing in between segments).

In some implementations of the current subject matter, physical separation of the segments to be scanned may not be desirable or possible. For instance, a long plank of wood with a target trace image on one side or a banner that is printed onto a single piece of paper cannot be physically separated into parts. Thus, in some cases, acquisition of the scans required to create a single, seamless trace may be achieved via the use of a pass-through slot as shown in FIG.

22. The pass-through slot may be integrated with passive and/or motorized rollers, treads, etc. If motorized, the rollers can be coordinated with the optical system components performing the trace functionality, thereby allowing the trace to be conducted in real time across an oversize piece of material. For example, the oversized material may be advanced at a specified time and/or rate that facilitates the required capture of information across a single, continuous image. If a motorized feed is present, then the optical system can omit some or all y-axis movement and rely solely on the feed mechanism to continually position the image for the purpose of scanning the oversized image. It should be appreciated that the material feed can be omnidirectional, for example, to allow movement of the oversized material in both a horizontal direction (e.g., x-axis) and a vertical direction (e.g., y-axis). The over-sized material may require movement in more than one direction for purposes of maintaining alignment.

In some cases, a user can manually feed the material to be traced through the pass-through slot with and/or without the aid of passive rollers. The machine vision system may guide the user with respect to the repositioning of the material in order to capture each segment with fidelity. For example, prompts and/or other indicators may be provided at the level of the user interface, and/or by the hardware itself. In some implementations of the current subject matter, visual camera views and/or renderings of which part of the material has already been imaged may be shown to the user, for example, via a graphic user interface. In another example, visual lighting cues that indicate where the leading edge and/or tailing edge of the image segments are relative to the material being scanned may be used as a guide for user-based movement of materials. Alternatively and/or additionally, audible prompts and/or other such human factors-based indicators may be used to enable the user to determine when they are moving the material closer or further away from the next desired frame for reposition during an oversized trace. For example, the audible prompt can include a continuous beeping noise that increases its periodicity when the material is moved more closely to the target area and decreases its beeping periodicity when material is moved further away from the target area. One or more additional sounds can also be played to indicate successful completion of all material movements into a desired location.

Figure 22:
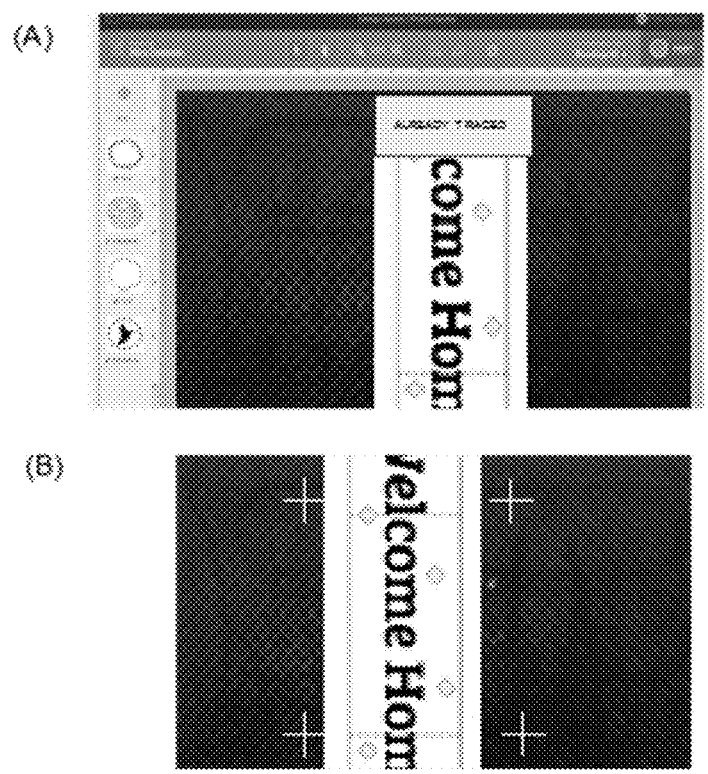
FIG. 22 is a diagram illustrating a user interface for guiding the movement and/or repositioning of a material through the pass-through slot of a CNC machine, consistent with some implementations of the current subject matter.

To further illustrate, FIG. 22 is a diagram illustrating a user interface for guiding the movement and/or repositioning of a material through the pass-through slot of the CNC machine 110, consistent with some implementations of the current subject matter. For instance, as shown in FIG. 22, user interface (A) may display an area that has already been traced differently than an area that has yet been traced. This visual distinction can aid the user in moving and/or repositioning the oversized material, for example, to a next section of the material that has not be traced by the CNC machine 100. Meanwhile, user interface (B) may include visual cues (e.g., white crosshairs that create a target area on the material bed 150 of the CNC machine 100) that guides the user in moving and/or repositioning the oversized material through the CNC machine 100. Once all components of an oversized image have been captured with a sufficient level of detail, the image segments may be stitched together using the techniques described earlier.

Figure 23:
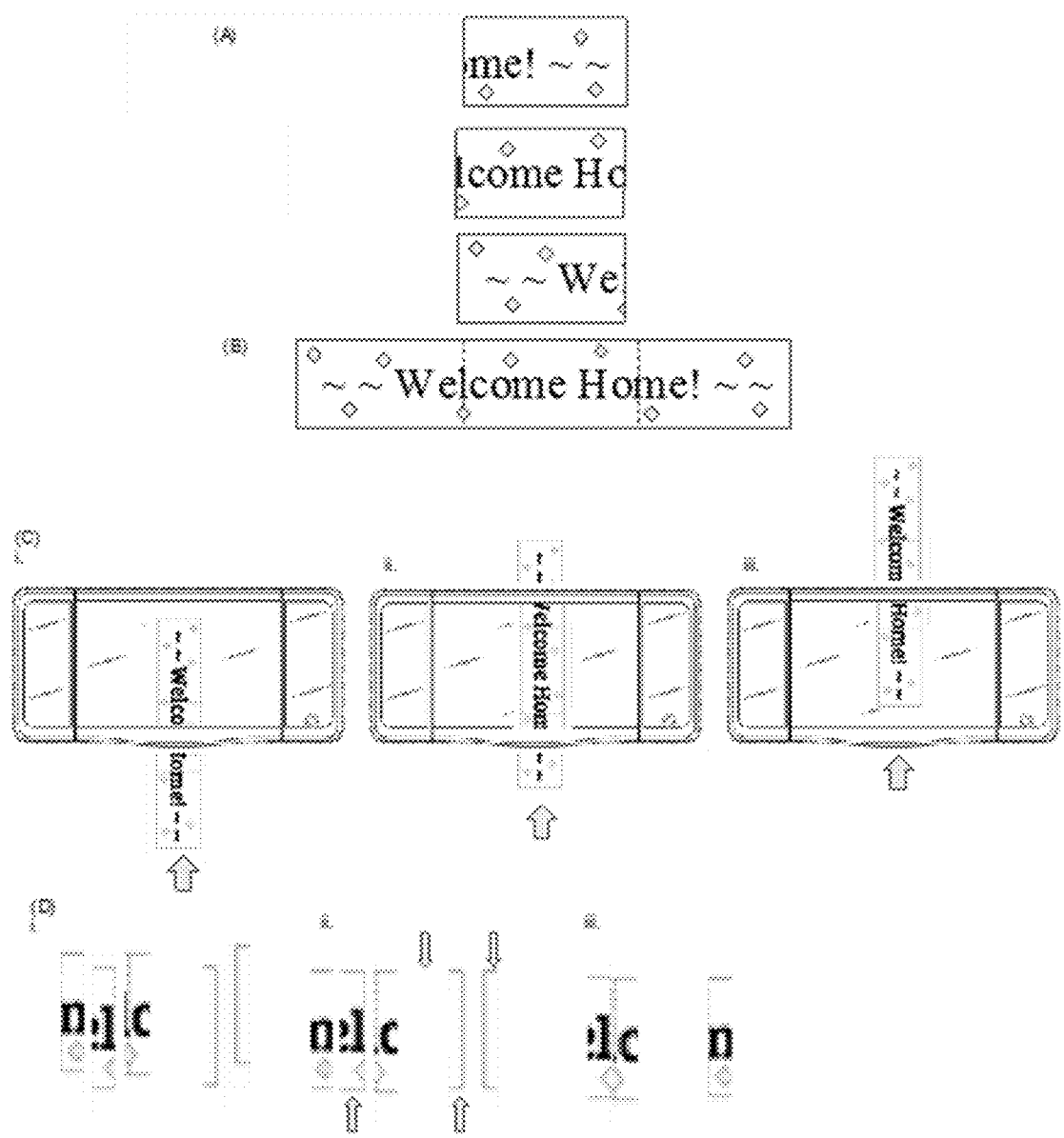
FIG. 23 is a diagram illustrating how an oversized source image on a paper banner may be obtained by manually feeding the oversized material through a pass-through slot on a CNC machine, consistent with some implementations of the current subject matter.

FIG. 23 is a diagram illustrating illustrates how an oversized source image on a paper banner may be obtained by manually feeding the oversized material through a pass-through slot on the CNC machine 100, consistent with some implementations of the current subject matter. The user edits the captured line art by reproducing a shrunken version of some aspect of the design with fidelity across the banner. Once all design elements are finalized, processing of the oversized material may occur in accordance with the user's intentions. In this example, the user-desired processing involves using the laser of the CNC machine 100 to cut directly on top of the original line art and faithfully reproducing shrunken versions of the line art at desired (previously blank) spaces on the material. The processing of the oversized project may again employ a variety of manual and/or automated material movement strategies to ensure continuity of processing.

The preceding concept can also extend to imaging features, text, materials, 3D objects, etc. associated with surfaces that are curved, non-uniform, warped or that present other such challenges to image capture. In this case, knowing the geometry of camera relative to the location of the design, in addition to taking repeated height measurements to model or scan the surface, or repeated still images from varying locations, can provide the necessary data to de-warp the image, thus preserving the real dimensions of the feature of interest. In one such application, the desired image to capture for processing may be the logotype on a curved surface of a cylinder, or that wraps over the edge of a folded surface (as shown in the example in FIG. 9); image capture and subsequent de-warping of the 3D mesh data could enable accurate reproduction of the logo-type on a desired surface with a different geometry. Alternate methods for achieving image capture are also possible, such as use of cameras with a focus to take multiple images at different focal depth exposures and then combining the images to capture the image in its entirety.

In other implementations, instead of capturing an optical image, a sensor (for example, a laser diode and camera, an ultrasonic distance sensor, stereoscopic images or the like) can be used to create a depth map. The depth map can be manipulated with software to rotate, scale, adjust, bend, or move the depth map into desired positions or applications. The depth map can be generated by scanning of objects, including electronic or mobile devices for the purpose of creating customizable skins or covers, or other objects based on the surface features of the scanned object. The height of an upper surface of the material relative to a bed or other supporting surface can be a proxy for the thickness of the material. Alternatively, or in addition, a thickness of a material can be estimated using a view form the one or more cameras that images a side of the material. Various image processing operations can be used to estimate or calculate a material thickness form such measurements.

Image Capture Feedback and On-Board Correction

Figure 14:
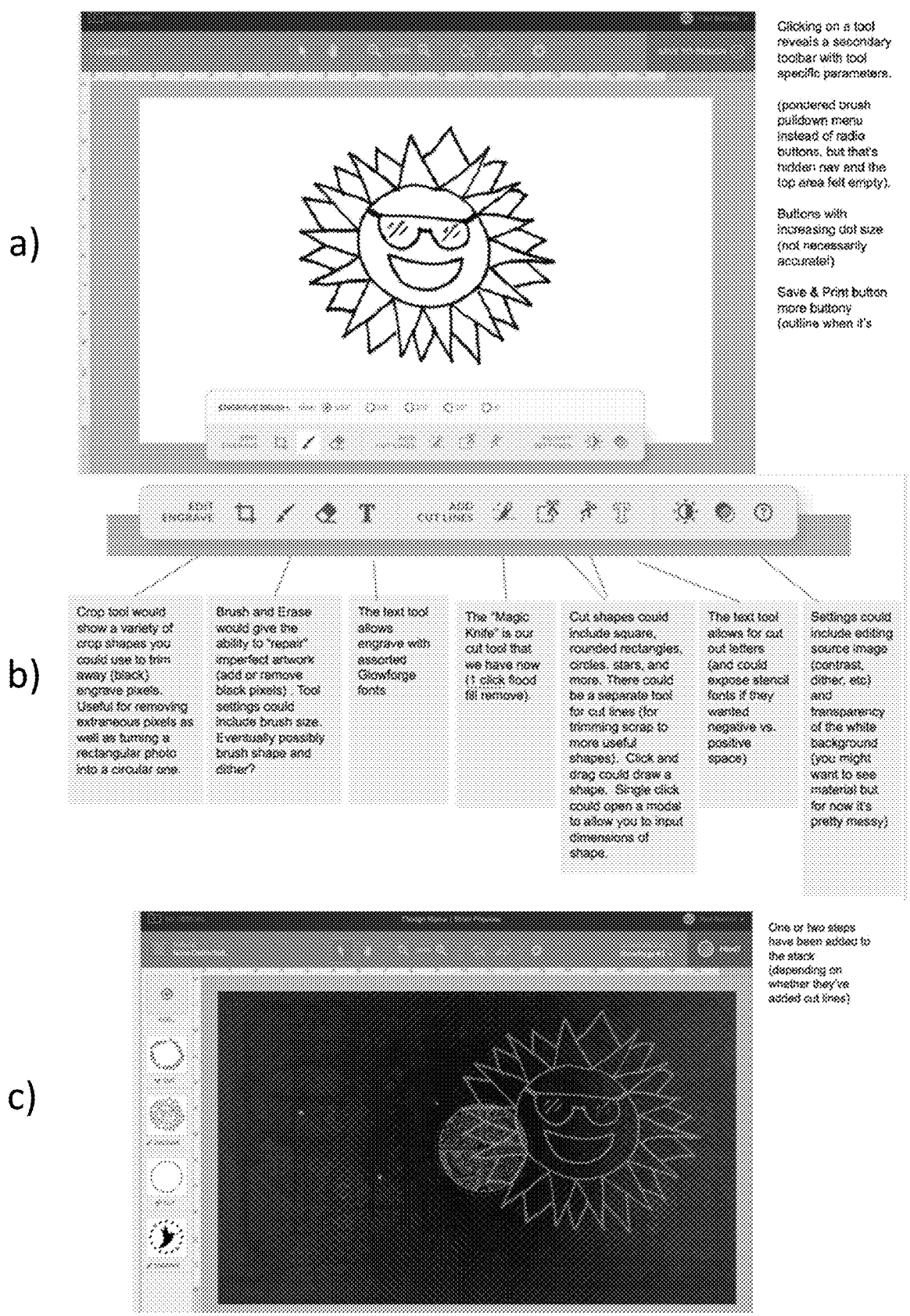
FIG. 14 is a diagram illustrating modifying a traced image and overlaying the modified image on a capture in the working area in the CNC machine, consistent with some implementations of the current subject matter.

FIG. 14 is a diagram illustrating modifying a traced image and overlaying the modified image on a capture in the working area in the CNC machine 100, consistent with some implementations of the current subject matter. User feedback and on-board correction can be included in preparing imagery for the purpose for cut-file generation and subsequent material processing. The use of interactive tools that permit users to see how material is being received by the capture software in real-time can allow users to determine whether the desired element has been imaged to their level of satisfaction.

As shown in FIG. 14 a), an image traced or captured from another image file can be displayed, with software tools that can allow a user to manipulate or edit the image. Software tools can be provided to retouch the captured imagery directly, rather than requiring modifications and re-tracing of the original image file. As shown by the examples in FIG. 14 b), such examples may include paintbrush tools that can add or embellish upon existing parts of the captured design, eraser tools for manual removal of image capture artifacts or components that are no longer desirable, and magic wand as a tool for selecting and removing contiguous or noncontiguous regions of a given color. In a further example, the use of an intent brush feature may produce better machining outputs downstream by identifying and correcting for features in the original image that may be imperfect (for example, this tool may perform a path simplification on a trace of a hand-drawn straight line, in order to achieve an exact straight line; i.e. the software renders a better representation of user intent than what was provided by the original trace image). The modified image can be overlaid onto an image of the working area, another different image, or the like, to provide a preview of what the CNC machine 100 will do. For example, in FIG. 14 c), the thicker lines at the perimeter of the traced sun can represent instructions to cut, whereas the thinner lines interior to the traced sun can represent instructions to engrave.

Image capture feedback can detect and flag potential problems associated with captured imagery, with respect to its suitability for processing by the CNC machine 100. This approach may leverage single components or combinations of data components relating to camera imagery and sensor data, particularly height sensing data. For example, users can receive notifications upon detection of curved or bent surfaces which cannot be adequately imaged with current camera settings. In some implementations, prompts or notifications can be generated by the previewing software for imaging improvements or make those improvements automatically. In other implementations, lighting artifacts and anomalies, (e.g., shadow lines or spotlighting effects) can be detected via analysis of pixel brightness and density. Such issues can be flagged by the analysis software even before the user has identified them, thus enhancing design efficiency and the user experience.

Preparing Cut-Files from Machine-Derived Imagery

In some implementations, details of a design that has been drawn directly onto the desired material can be captured. The CNC machine 100 can then directly process over the top of said images to cause the desired changes to the material. In some implementations, this can be performed by imaging the material, removing distortions from the image (e.g. distortions introduced by the scanning camera), transforming the resulting image into a set of machine instructions necessary to cause the desired changes, not just on the material, but also over the source image, and executing the instructions.

Figure 15:
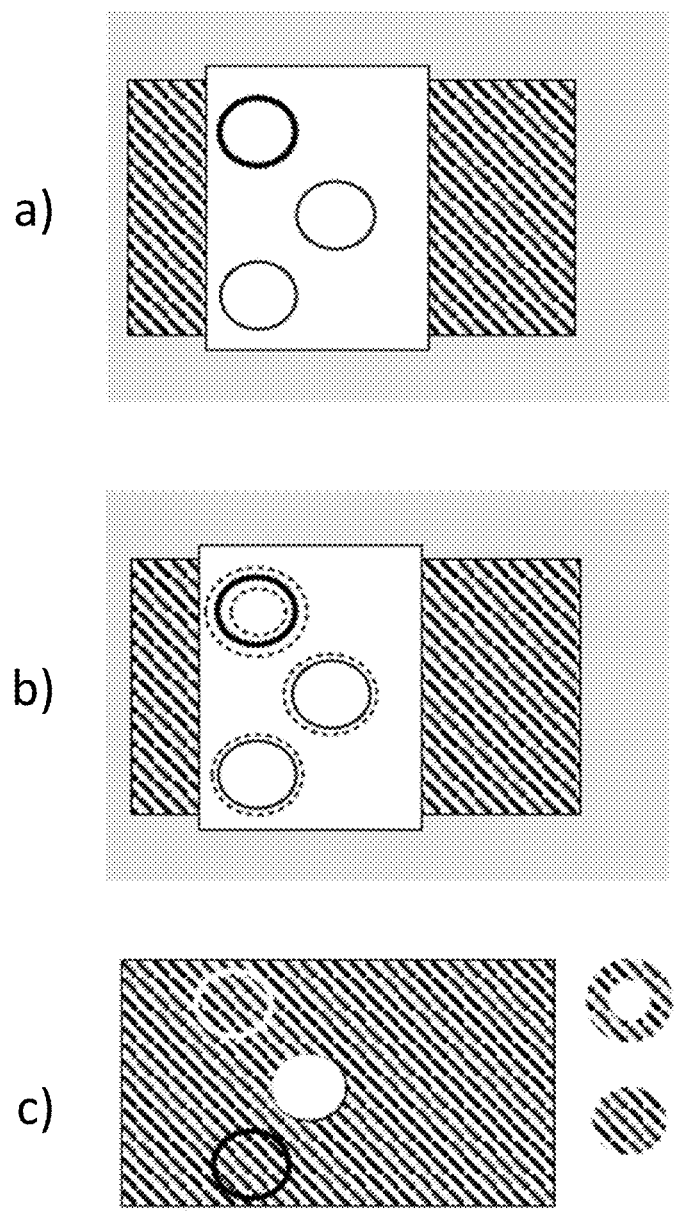
FIG. 15 is a diagram illustrating the creation of a machine file from a traced image and user-selected input, consistent with some implementations of the current subject matter.

FIG. 15 is a diagram illustrating the creation of a machine file from a traced image and user-selected input, consistent with some implementations of the current subject matter. A user can designate portions of an image to be machined according to both analysis of the image (e.g outlines, colors, etc.) and user-supplied input selecting a mode of operation of the CNC machine 100 (e.g. cutting, engraving, etc.). FIG. 15 a) shows a top view of a piece of paper (white rectangle), with three circles imaged on the top of the deiced piece of material (shown by the diagonal striped rectangle) positioned within the material bed 150 of the CNC machine 100 (grey rectangle). FIG. 15 b) shows that based on user input, the user can define regions of commonality that can be associated with specific instructions (dotted lines). Here, the lower circle can be selected as a path for engraving. The middle circle can be selected as a path for cutting. For the upper circle, both interior and exterior borders can be identified as cut paths. As shown in FIG. 15 c), this can result in the manipulation of the material 140 as it lies directly under the image. In this example, the machine file generated in 15 b) would produce an engraved lower circle, a cutout middle circle and a cutout donut shape. The cut-out material is shown as removed to the right of 15 c).

In some implementations, the CNC machine 100 and various computational methods can create a cut-file from a traced image. One approach of achieving this can include analyzing an image to find distinct edges of pixels of one color (e.g. black) relative to pixels of another color (e.g. white) and the subsequent generation of a vector path at their intersection. A high-pass filter applied to the image can remove gradients of light resulting, for example from environmental effects, so that user-generated markings are left intact. Some implementations can involve the use of a contour trace algorithm to seek regions of continuity and determine the placement of a path around the perimeter of that region, for example to send instructions to the CNC machine 100 that a region that shares a similar appearance should be cut out from the rest. Algorithmic interpretation of an image file can be used to automatically predict at least one user intention for a given cut-file. For example, regions with detected common qualities may permit users to globally apply specific formatting or behaviors. In one example, a circle with a thick outline may be treated as a separate entity than a circle with a thin outline, and the user may select cutting properties accordingly. Similarly, color can also indicate processing intentions. For example, features drawn in red ink are to be cut while blue-inked features are meant for engraving. A variety of processing intentions and markings may be possible including cutting, scoring, and engraving.

Figure 16:
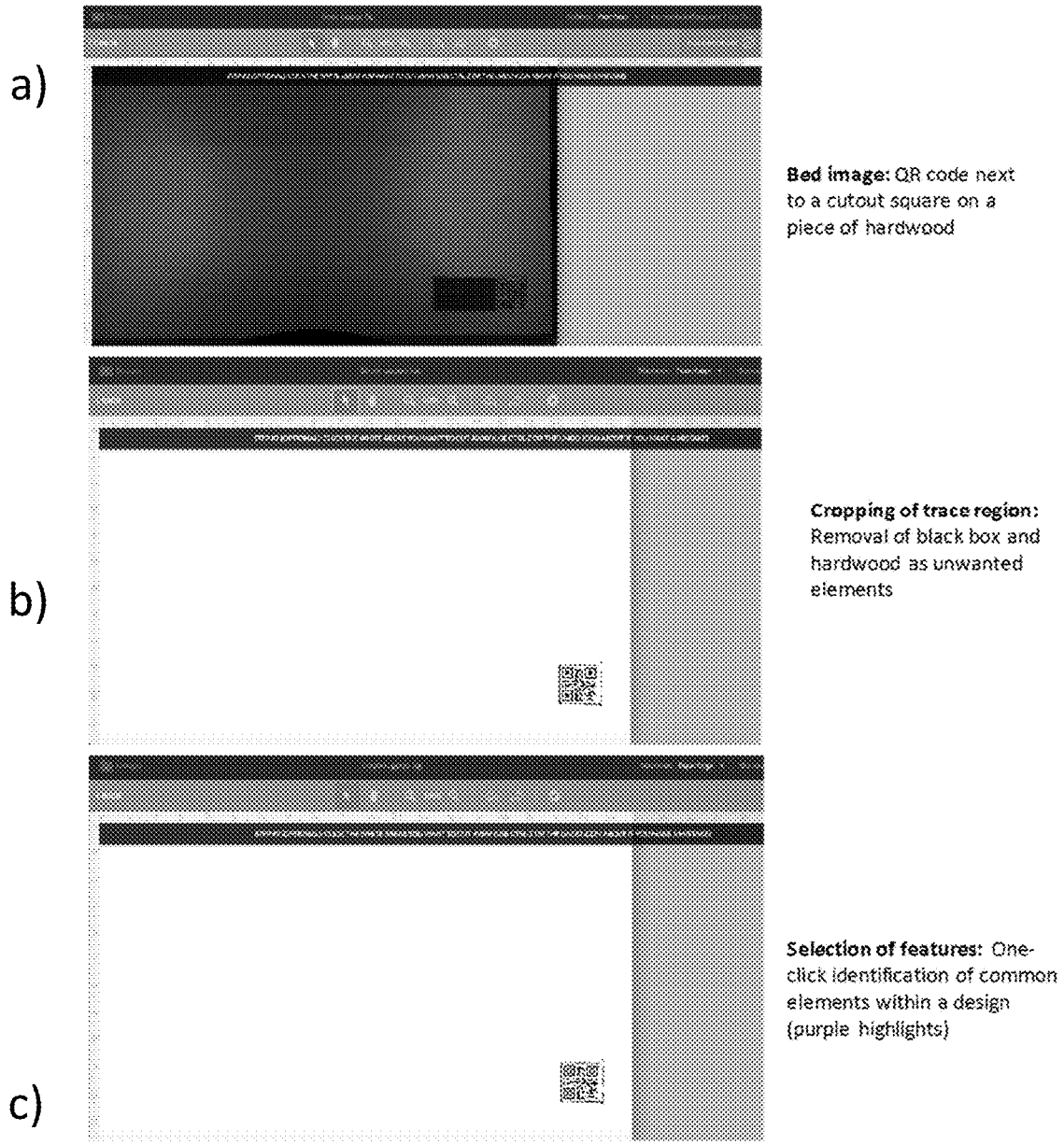
FIG. 16 is a diagram illustrating isolating of elements in an image and designating CNC machine instructions to portions of the isolated elements, consistent with some implementations of the current subject matter.

FIG. 16 is a diagram illustrating isolating of elements in an image and designating CNC machine instructions to portions of the isolated elements, consistent with some implementations of the current subject matter. In creating machine file instructions, users can crop only the design regions of interest, rather than tracing all elements captured by a given camera. This can include selecting regions to retain (e.g. components of finished designs) versus components that may be ignored (e.g. scrap material, parts of the CNC machine 100 like the rails or the material bed 150, etc). Such feature assignments can occur automatically or be manually inputted by the user. Materials designated into certain categories can be further tracked and stored as part of machine or use analytics for potential future use (for example, scrap material may be chronicled for inventory management).

In the example shown by FIG. 16 a), an image has the material bed with a piece of cardboard and a QR code 1610 placed next to the piece of cardboard. Through a user interface, the user can crop out the portions of the image that are not of interest. In this example, shown at FIG. 16 b) only the QR code has been selected to remain in the image. Then, at FIG. 16 c) the user (or the software) can select certain features for machining on a piece of material. Elements sharing a common design or particular features can be extracted through image analysis or user selection. In this example, the three squares 1620 in the QR code have been selected.

In some implementations, the perimeter of a material can be identified and located in the CNC machine 100 when that perimeter is not yet known. This can be used for scanning (for example to identify a region to scan) or other purposes such as positioning a design on material for processing. This can be accomplished through a variety of means, such as recognizing the bed of the machine and identifying regions that look different; identifying material by its characteristic appearance, for example white pixels representing a white sheet of paper; or identifying specially placed features, such as a barcode tiled across the surface or fiducial markers placed at a fixed distance relative to the material's perimeter to indicate that perimeter, such as markers placed a fixed distance from the perimeter from which the perimeter can be determined.

In other implementations, identifying that a given image is of a particular general category can allow application of a set of generalizable rules or default settings that govern how these types of images are to be processed. For example, a photograph can be considered a distinct image type. Then, machine file generation defaults can be set in accordance with the typical use requirements for processing photos (e.g. use of dithering, rather than cut-line generation). This approach can also be used with multi-item identification, for example, the incorporation of mixed media elements into the article design process. This can be when the user wishes to treat elements from a photograph placed on one side of the bed differently to a cylindrical object placed on the other side of the bed in creation of an article that combines elements of the two.

End-to-End Creation with a Single Machine

Some implementations can perform end-to-end image capture and recreation using a single CNC machine such as, for example, the CNC machine 100. Here, the CNC machine 100, and any cameras (e.g., the lid camera 110 and/or the head camera 120) or other sensors connected thereto, can capture some or all of the images that contribute to a design. The same CNC machine 100 can compute analyses, corrections or other manipulations to that imagery and then going through the process to create a machine file. The machine file can contain all elements necessary for creation of a desired article. Consequently, the same CNC machine 100 can then execute its own generated machine file by processing material into the desired article or component articles. Further, the CNC machine 100 can be used to execute that machine file in the same location, on the same material, as its source image. For example, a line drawn on a board may be used to cut that board in half. Some applications may exploit the end-to-end capabilities of the machine, either in whole or in part. For example, an image captured by a user can be subjected to a series of visual corrections that lead to generation of a machine file. The visual corrections can be processed immediately or saved and stored for further manipulation or processing at a later time point. The concept of end-to-end capture and recreation can also include the use of multiple CNC machines of a similar type to perform imaging, correction, or processing steps.

CNC Machine Instructions Based on Objects in a CNC Machine

Some implementations can include, for example, capturing an image, where the image includes a design. The capturing can be performed by a camera positioned within a housing that encloses the working area of the CNC machine 100.

As used herein, the term "design" can include any visible feature of the object or image in question. For example, a design can be an outline, a color, a shading, a gradient, a texture, a pattern, a physical property such as a length, width, depth of a recess, or the like. As one specific, non-limiting example, a user can place a round wooden disk with a letter A in the CNC machine 100. An image of the disk can be generated and the user can select, or trace, the letter "A" in the image. Here, "A" is one design that includes three lines. Later, the circular outline of the disk can be selected or traced. Now here, the circular outline is the design. For each design, the user can specify a particular operation of the CNC machine 100, for example, engraving the "A" onto a square piece of material and cutting out a circular portion based on the shape of the disk.

While in some implementations, the image or design can be generated by cameras (e.g., the lid camera 110 and/or the head camera 120) in the CNC machine 100, or by user input, images or designs used by the CNC machine 100 can also be received from another computing system. For example, a jpeg file of the disk with the "A" can be received and interpreted as the image having the designs. Images and designs can be in any electronic format, for example, jpegs, pdfs, bitmaps, gifs, or the like.

As described above, features of the design can be identified from the image. A feature can be a subset of the design, or can be the entire design. For example, the design described as the letter "A" can have three identified features, two angled lines and one horizontal line. The identification can be performed by, for example, interpreting user-input that specifies a feature of the image, receiving the output of an image analysis or photo-manipulation program that extracts features or designs from the image, or the like.

In other implementations, the features can include a first pattern on a surface of the material. The first pattern can include a grain, a drawing, a carving, a color, or the like, that is visible on the surface of the material. The features can also be a second pattern on a surface of an item other than the material. As used herein, the term "design" generally refers to an overall design that can include one or more features. The features can each have one or more patterns that describe properties of the features. Accordingly, any of the design, features, or patterns can include any visible or detectable property that can be converted to an instruction of the CNC machine. For example, an item, such as a drawing, can be placed in the CNC machine. A second pattern can be an outline of a person on the drawing, as distinct from a first pattern, such as a wood grain on the material also in the CNC machine. The item can be any sort of object, for example, a drawing on paper, an article of clothing, a keychain, a model piece, or the like. The features can also include any physical features of the material or item, similar to that of a pattern.

Software can be used to correct, improve, or modify, any of the images that can be presented to a user, or referenced by other programs operating with the CNC machine, to improve the image quality. In some implementations, the preview can be generated by at least executing one or more operations applied to the image to correct one or more dimensions of the design as generated in the preview based on the image. The operations can include, for example, de-distortion or de-warping, such as described elsewhere within.

CNC Machine Instructions Based on Images Overlaid on Objects in a CNC Machine

Other implementations can also include overlaying, on a graphical representation of the material 140 in the CNC machine 100, an external image. However, here the image can be, for example, supplied by a user, generated by a drawing program, traced through a user interface, or the like, as opposed to generated from an object inside the CNC machine 100.

As described above, to serve as a backdrop, the generating of the preview can include capturing a view of the material while the material is positioned within the work area, the capturing comprising use of the one or more cameras. As used herein, the term "view" (generally referring to the background material) is provided only to distinguish from the "image" (generally referring to a representation of a change to the background material). Both the view and the image can be graphical images or image files configured to be stored by a computer or displayed at a user-interface. The capturing can include any of the image capturing techniques described herein. Also, similar to that described above, the capturing can include correcting one or more dimensions of the image as generated in the preview. The correcting can include, for example, de-distortion, de-warping, correction for lighting effects, adjustment of lighting within the casing, and thresholding.

In some implementations, a preview can be generated as a precursor or as an integral part of, creating the machine file. For example, generating the preview can include displaying the view of the material to a user via a user interface. Creating the machine file can also include receiving user input via a user interface. The user input can include generating a design and positioning a design in a desired location relative to the material as shown in the view. There can be other sources of the design, for example, importing a graphical file that includes the design, automatic extraction of a design from another image, or the like. Furthermore, the creating of the machine file can also include receiving, at the user interface, a selection of a feature in the design, and an indication of whether the selected feature is to be cut or engraved. For example, if a user wanted to engrave an "A" onto a wood block in the CNC machine 100, the preview can first display a view of the wood block as it appears in the CNC machine 100. Then, the user, through the user-interface, can select or designate the image of design including the "A" and position the design as desired on the view. The features of the design, for example, the lines that make up the "A" can be selected by the user to be cut or engraved, what machine settings to apply, or the like.

At any time, the user or other program in control of the CNC machine 100 can create a machine file to cause the CNC machine 100 to create the design on the material as shown in the preview.

According to various implementations of the current subject matter, a method for fabrication with image tracing can include generating, by a camera having a view of an interior portion of a computer-numerically-controlled machine, an image comprising a pattern. The image can be transformed into a set of machine instructions for controlling the computer-numerically-controlled machine to effect a change in a material. The change can correspond to at least a portion of the pattern. At least one machine instruction from the set of machine instructions can be executed to control the computer-numerically-controlled machine to effect at least a portion of the change. The execution can include operating, in accordance with the at least one machine instruction, a tool coupled with the computer-numerically-controlled machine. The tool can configured to effect the change on the material.

The transformation can include: analyzing the image to identify one or more features of the material; analyzing the image to identify the pattern on the surface of the material, the pattern being identified independently from the one or more features; and generating the set of machine instructions to cause the computer-numerically-controlled machine to effect the change on the material based at least on the pattern on the surface of the material.

The pattern can be applied directly onto the material. The tool can trace the pattern on the material based at least on the image comprising the pattern.

An operation can be executed with respect to the image to correct one or more features of the pattern comprising the image. The operation can include one or more of de-distortion, de-warping, correction for lighting effects, adjustment of lighting within a housing of the computer-numerically-controlled machine, and thresholding.

The camera can be positioned to capture all of a material bed comprising the computer-numerically-controlled machine. The material can be at least partially disposed on the material bed.

One or more additional images can be generated based at least on an analysis of the image. The analysis can include determining that the image fails to capture one or more features of the material The image can be interpreted to predict a user intention. The transformation of the image into the set of machine instructions can be based at least on the user intention. The interpretation can include: identifying a feature in at least a portion of the image; and executing the at least one machine instruction from the set of machine instructions to effect the change having one or more properties corresponding to the feature identified in at least the portion of the image. The user intention can be predicted automatically by the computer-numerically-controlled machine without requiring user-generated input. The user intention can be applied globally to specify the one or more properties of the change based at least on the detected feature being common throughout the image.

According to some implementations of the current subject matter, a method for fabrication with image tracing can include generating, by a camera having a view of an interior portion of a computer-numerically-controlled machine, an image comprising a pattern. The image can be transformed into a first set of machine instructions for controlling the computer-numerically-controlled machine to effect a first change in a material. The change can correspond to at least a portion of the pattern. The first set of machine instructions can be combined with a second set of machine instructions to generate a third set of machine instructions. The second set of machine instructions can control the computer-numerically-controlled machine to effect a second change in the material. At least one machine instruction from the third set of machine instructions can be executed to control the computer-numerically-controlled machine to effect the first change and/or the second change. The execution can include operating, in accordance with the at least one machine instruction, a tool coupled with the numerically-controlled-machine. The tool can be configured to effect the first change and/or the second change directly onto the material.

According to some implementations of the current subject matter, a method for fabrication with image tracing can include generating, by a camera having a view of an interior portion of a computer-numerically-controlled machine, a first image. A second image including a pattern can be transformed into a set of machine instructions for controlling the computer-numerically-controlled machine to effect a change in a material. The change can correspond to at least a portion of the pattern. The change can be at a position determined based at least on the first image. At least one machine instruction from the set of machine instructions can be executed to control the computer-numerically-controlled machine to effect the change. The execution can include operating, in accordance with the at least one machine instruction, a tool coupled with the computer-numerically-controlled machine. The tool can be configured to effect the change directly onto the material One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computer-numerically-controlled (CNC) machine comprising:
   at least one camera;
   at least one processor;
   at least one non-transitory computer-readable medium; and
   program instructions stored on the at least one non-transitory computer-readable medium that are executable by the at least one processor such that the CNC machine is configured to:
   capture, via the at least one camera, an image of a pattern disposed on a first material within an interior portion of the CNC machine;
   based on a first characteristic of the image comprising a first line color, determine a first set of machine instructions for controlling a tool of the CNC machine to effect a first type of change to a surface of a second material and thereby cause a first portion of the pattern to be disposed on the second material;
   based on a second characteristic of the image comprising a second line color, determine a second set of machine instructions for controlling the tool to effect a second type of change to the surface of the second material and thereby cause a second portion of the pattern to be disposed on the second material;
   execute the first set of machine instructions to operate the tool to effect the first type of change to the surface of the second material and thereby cause the first portion of the pattern to be disposed on the second material; and
   execute the second set of machine instructions to operate the tool to effect the second type of change to the surface of the second material and thereby cause the second portion of the pattern to be disposed on the second material.

2. The CNC machine of claim 1, wherein the program instructions that are executable by the at least one processor such that the CNC machine is configured to capture the image of the pattern disposed on the first material comprise program instructions that are executable by the at least one processor such that the CNC machine is configured to capture the image of the pattern disposed at a first location on the first material; and
wherein the program instructions that are executable by the at least one processor such that wherein the program instructions that are executable by the at least one processor such that the CNC machine is configured to execute the first set of machine instructions to operate the tool of the CNC machine to effect the first type of change to the surface of the second material and thereby cause the first portion of the pattern to be disposed on the second material comprise program instructions that are executable by the at least one processor such that the CNC machine is configured to cause the first portion of the pattern to be disposed at a second location on the second material.

3. The CNC machine of claim 1, wherein the first portion of the pattern comprises a line drawing.

4. The CNC machine of claim 1, wherein the tool comprises a source of electromagnetic radiation, and wherein the program instructions that are executable by the at least one processor such that the CNC machine is configured to execute the first set of machine instructions to operate the tool of the CNC machine to effect the first type of change to the surface of the second material comprise program instructions that are executable by the at least one processor such that the CNC machine is configured to execute the first set of machine instructions to operate the tool to cut the surface of the second material.

5. The CNC machine of claim 1, wherein the program instructions that are executable by the at least one processor such that the CNC machine is configured to determine the first set of machine instructions comprise program instructions that are executable by the at least one processor such that the CNC machine is configured to:
transmit the image over a network to a computing system; and
receive over the network, from the computing system, the first set of machine instructions.

6. The CNC machine of claim 1, wherein the program instructions that are executable by the at least one processor such that the CNC machine is configured to determine the first set of machine instructions comprise program instructions that are executable by the at least one processor such that the CNC machine is configured to:
generate the first set of machine instructions.

7. The CNC machine of claim 1, further comprising:
a moveable gantry, wherein the at least one camera and the tool are coupled to the moveable gantry.

8. The CNC machine of claim 1, further comprising:
an openable lid that provides access to the interior portion of the CNC machine, wherein the at least one camera is mounted to an interior surface of the CNC machine.

9. The CNC machine of claim 1, wherein the first material and the second material are different materials.

10. The CNC machine of claim 1, wherein the program instructions that are executable by the at least one processor such that the CNC machine is configured to capture the image of the pattern disposed on the first material comprise program instructions that are executable by the at least one processor such that the CNC machine is configured to capture the image of the pattern having a first size;
wherein the program instructions that are executable by the at least one processor such that wherein the program instructions that are executable by the at least one processor such that the CNC machine is configured to (i) determine the first set of machine instructions, and (ii) determine the second set of machine instructions comprise program instructions that are executable by the at least one processor such that the CNC machine is configured to determine the first and second sets of machine instructions for controlling the tool to effect the first and second types of change to the surface of the second material and thereby cause a scaled version of the pattern to be disposed on the second material, wherein the scaled version of the pattern is either larger or smaller than the pattern having the first size; and
wherein the program instructions that are executable by the at least one processor such that wherein the program instructions that are executable by the at least one processor such that the CNC machine is configured to execute the first and second sets of machine instructions comprise program instructions that are executable by the at least one processor such that the CNC machine is configured to execute the first and second sets of machine instructions to operate the tool of the CNC machine to effect the first and second types of change to the surface of the second material and thereby cause the scaled version of the pattern to be disposed on the second material.

11. A non-transitory computer-readable medium, wherein the non-transitory computer-readable medium is provisioned with program instructions that, when executed by at least one processor, cause a computer-numerically-controlled (CNC) machine comprising at least one camera to:
capture, via the at least one camera, an image of a pattern disposed on a first material within an interior portion of the CNC machine;
based on a first characteristic of the image comprising a first line color, determine a first set of machine instructions for controlling a tool of the CNC machine to effect a first type of change to a surface of a second material and thereby cause a first portion of the pattern to be disposed on the second material;
based on a second characteristic of the image comprising a second line color, determine a second set of machine instructions for controlling the tool to effect a second type of change to the surface of the second material and thereby cause a second portion of the pattern to be disposed on the second material;
execute the first set of machine instructions to operate the tool to effect the first type of change to the surface of the second material and thereby cause the first portion of the pattern to be disposed on the second material; and
execute the second set of machine instructions to operate the tool to effect the second type of change to the surface of the second material and thereby cause the second portion of the pattern to be disposed on the second material.

12. The non-transitory computer-readable medium of claim 11, wherein the program instructions that, when executed by at least one processor, cause the CNC machine to capture the image of the pattern disposed on the first material comprise program instructions that, when executed by at least one processor, cause the CNC machine to capture the image of the pattern disposed at a first location on the first material; and wherein the program instructions that, when executed by at least one processor, cause the CNC machine to execute the first set of machine instructions to operate the tool of the CNC machine to effect the first type of change to the surface of the second material and thereby cause the first portion of the pattern to be disposed on the second material comprise program instructions that, when executed by at least one processor, cause the CNC machine to cause the first portion of the pattern to be disposed at a second location on the second material.

13. The non-transitory computer-readable medium of claim 11, wherein the program instructions that, when executed by at least one processor, cause the CNC machine to determine the first set of machine instructions comprise program instructions that, when executed by at least one processor, cause the CNC machine to:

transmit the image to a cloud-based computing system; and receive, from the cloud-based computing system, the first set of machine instructions.

14. The non-transitory computer-readable medium of claim 11, wherein the program instructions that, when executed by at least one processor, cause the CNC machine to determine the first set of machine instructions comprise program instructions that, when executed by at least one processor, cause the CNC machine to:

generate the first set of machine instructions.

15. The non-transitory computer-readable medium of claim 11, wherein the CNC machine further comprises an openable lid that provides access to the interior portion of the CNC machine, and wherein the at least one camera is mounted to an interior surface of the lid.

16. The non-transitory computer-readable medium of claim 11, wherein the first material and the second material are different materials.

17. The non-transitory computer-readable medium of claim 11, wherein the program instructions that, when executed by at least one processor, cause the CNC machine to capture the image of the pattern disposed on the first material comprise program instructions that, when executed by at least one processor, cause the CNC machine to capture the image of the pattern having a first size;

wherein the program instructions that, when executed by at least one processor, cause the wherein the program instructions that, when executed by at least one processor, cause the CNC machine to (i) determine the first set of machine instructions, and (ii) determine the second set of machine instructions comprise program instructions that, when executed by at least one processor, cause the CNC machine to determine the first and second sets of machine instructions for controlling the tool to effect the first and second types of change to the surface of the second material and thereby cause a scaled version of the pattern to be disposed on the second material, wherein the scaled version of the pattern is either larger or smaller than the pattern having the first size; and wherein the program instructions that, when executed by at least one processor, cause the CNC machine to execute the first and second sets of machine instructions comprise program instructions that, when executed by at least one processor, cause the CNC machine to execute the first and second sets of machine instructions to operate the tool to effect the first and second types of change to the surface of the second material and thereby cause the scaled version of the pattern to be disposed on the second material.

18. A method carried out by a computer-numerically-controlled (CNC) machine comprising at least one camera, the method comprising:

capturing, via the at least one camera, an image of a pattern disposed on a first material within an interior portion of the CNC machine;

based on a first characteristic of the image comprising a first line color, determining a first set of machine instructions for controlling a tool of the CNC machine to effect a first type of change to a surface of a second material and thereby cause a first portion of the pattern to be disposed on the second material;

based on a second characteristic of the image comprising a second line color, determining a second set of machine instructions for controlling the tool to effect a second type of change to the surface of the second material and thereby cause a second portion of the pattern to be disposed on the second material;

executing the first set of machine instructions to operate the tool to effect the first type of change to the surface of the second material and thereby cause the first portion of the pattern to be disposed on the second material; and executing the second set of machine instructions to operate the tool to effect the second type of change to the surface of the second material and thereby cause the second portion of the pattern to be disposed on the second material.

19. The CNC machine of claim 1, wherein the program instructions that are executable by the at least one processor such that the CNC machine is configured to execute the first set of machine instructions to operate the tool to effect the first type of change to the surface of the second material comprise program instructions that are executable by the at least one processor such that the CNC machine is configured to operate the tool to engrave the surface of the second material; and wherein the program instructions that are executable by the at least one processor such that wherein the program instructions that are executable by the at least one processor such that the CNC machine is configured to execute the second set of machine instructions to operate the tool to effect the second type of change to the surface of the second material comprise program instructions that are executable by the at least one processor such that the CNC machine is configured to cut through the second material.

* * * * *